United States Patent
Yasukawa et al.

(10) Patent No.: US 10,743,298 B2
(45) Date of Patent: Aug. 11, 2020

(54) USER APPARATUS, BASE STATION, COMMUNICATION METHOD, AND INDICATION METHOD

(71) Applicant: NTT DOCOMO, INC., Tokyo (JP)

(72) Inventors: Shimpei Yasukawa, Tokyo (JP); Satoshi Nagata, Tokyo (JP); Hiroki Harada, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/762,435

(22) PCT Filed: Sep. 12, 2016

(86) PCT No.: PCT/JP2016/076804
§ 371 (c)(1),
(2) Date: Mar. 22, 2018

(87) PCT Pub. No.: WO2017/051740
PCT Pub. Date: Mar. 30, 2017

(65) Prior Publication Data
US 2018/0279267 A1 Sep. 27, 2018

(30) Foreign Application Priority Data
Sep. 24, 2015 (JP) .................................. 2015-187521

(51) Int. Cl.
*H04W 72/04* (2009.01)
*H04W 48/12* (2009.01)
(Continued)

(52) U.S. Cl.
CPC ......... *H04W 72/042* (2013.01); *H04W 48/10* (2013.01); *H04W 48/12* (2013.01);
(Continued)

(58) Field of Classification Search
None
See application file for complete search history.

(56) References Cited

U.S. PATENT DOCUMENTS

| 9,642,128 B2 * | 5/2017 | Kim ...................... H04W 8/005 |
| 2014/0328329 A1 * | 11/2014 | Novlan ............... H04W 72/042 370/336 |

(Continued)

FOREIGN PATENT DOCUMENTS

| WO | 2014/133279 A1 | 9/2014 |
| WO | 2015005316 A1 | 1/2015 |

(Continued)

OTHER PUBLICATIONS

Extended European Search Report issued in corresponding European Application No. 16848528.2, dated Jun. 1, 2018 (13 pages).
(Continued)

*Primary Examiner* — Michael J Moore, Jr.
(74) *Attorney, Agent, or Firm* — Osha Liang LLP

(57) ABSTRACT

A user apparatus in a radio communication system that supports D2D includes: an acquisition unit configured to acquire radio parameter information including a D2D radio parameter managed in a unit of a predetermined region including a plurality of cells from a base station; and a communication unit configured to transmit and receive a D2D signal using the D2D radio parameter in the predetermined region.

19 Claims, 28 Drawing Sheets

(51) Int. Cl.
   *H04W 48/10* (2009.01)
   *H04W 92/18* (2009.01)
   *H04W 48/14* (2009.01)
   *H04W 4/40* (2018.01)

(52) U.S. Cl.
   CPC .............. *H04W 72/04* (2013.01); *H04W 4/40* (2018.02); *H04W 48/14* (2013.01); *H04W 92/18* (2013.01)

(56) References Cited

U.S. PATENT DOCUMENTS

| | | | |
|---|---|---|---|
| 2015/0382389 A1 | 12/2015 | Seo | |
| 2016/0165585 A1 | 6/2016 | Saiwai et al. | |
| 2016/0219566 A1 | 7/2016 | Jung et al. | |
| 2016/0227416 A1* | 8/2016 | Suzuki | H04W 74/004 |
| 2016/0249341 A1 | 8/2016 | Jung et al. | |
| 2017/0041773 A1* | 2/2017 | Fujishiro | H04W 8/005 |
| 2017/0041916 A1* | 2/2017 | Soret | H04W 8/005 |
| 2017/0094702 A1* | 3/2017 | Yasukawa | H04W 72/0406 |
| 2017/0244501 A1* | 8/2017 | Yasukawa | G01S 11/06 |
| 2018/0206211 A1* | 7/2018 | Seo | H04W 72/02 |
| 2018/0249448 A1* | 8/2018 | Yasukawa | H04W 72/042 |
| 2018/0270722 A1* | 9/2018 | Kim | H04W 72/10 |
| 2019/0058980 A1* | 2/2019 | Zhang | H04L 1/00 |

FOREIGN PATENT DOCUMENTS

| | | | |
|---|---|---|---|
| WO | 2015065106 A1 | 5/2015 | |
| WO | 2015114052 A1 | 8/2015 | |

OTHER PUBLICATIONS

3GPP TR 22.885 V1.0.0; "3rd Generation Partnership Project; Technical Specification Group Services and System Aspects; Study on LTE Support for V2X Services (Release 14)"; Sep. 2015 (42 pages).

International Search Report issued in PCT/JP2016/076804 dated Nov. 15, 2016 (4 pages).

Written Opinion issued in PCT/JP2016/076804 dated Nov. 15, 2016 (4 pages).

Nokia, et al.; "D2D Discovery Signal"; 3GPP TSG-RAN WG1 Meeting #74bis, R1-134538; Guangzhou, China; Oct. 7-11, 2013 (7 pages).

Bertenyi, B.; "Key drivers for LTE success: Services Evolution"; 3GPP Seminar, LTE Asia; Sep. 6, 2011 (15 pages).

Office Action issued in the counterpart Japanese Patent Application No. 2017541521, dated Oct. 16, 2018 (6 pages).

3GPP TS 36.300 V13.1.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" Sep. 2015 (254 pages).

3GPP TS 31.102 V12.8.1 "3rd Generation Partnership Project; Technical Specification Group Core Network and Terminals; Characteristics of the Universal Subscriber Identity Module (USIM) application (Release 12)" Jul. 2015 (259 pages).

Office Action issued in European Application No. 16848528.2; dated Mar. 20, 2020 (14 pages).

* cited by examiner

FIG.8A

| REGION IDENTIFIER |
|---|
| REGION RANGE |
| RADIO PARAMETER |
| ⋮ |
| RADIO PARAMETER |

FIG.8B

| REGION IDENTIFIER LIST |
|---|
| RADIO PARAMETER |
| ⋮ |
| RADIO PARAMETER |

FIG.8C

| RADIO PARAMETER |
|---|
| ⋮ |
| RADIO PARAMETER |

FIG.9

| CARRIER FREQUENCY, BANDWIDTH |
| --- |
| RESOURCE POOL STRUCTURE |
| TIME/FREQUENCY HOPPING PATTERN |
| TRANSMISSION POWER CONTROL PARAMETER |
| SYNCHRONIZATION SIGNAL TRANSMISSION SETTING |
| SYNCHRONIZATION SIGNAL RECEPTION SETTING |
| REFERENCE SIGNAL STRUCTURE |
| D2D RADIO RESOURCE ALLOCATION INFORMATION |
| SYNCHRONIZATION REFERENCE CARRIER AND CELL ID LIST |

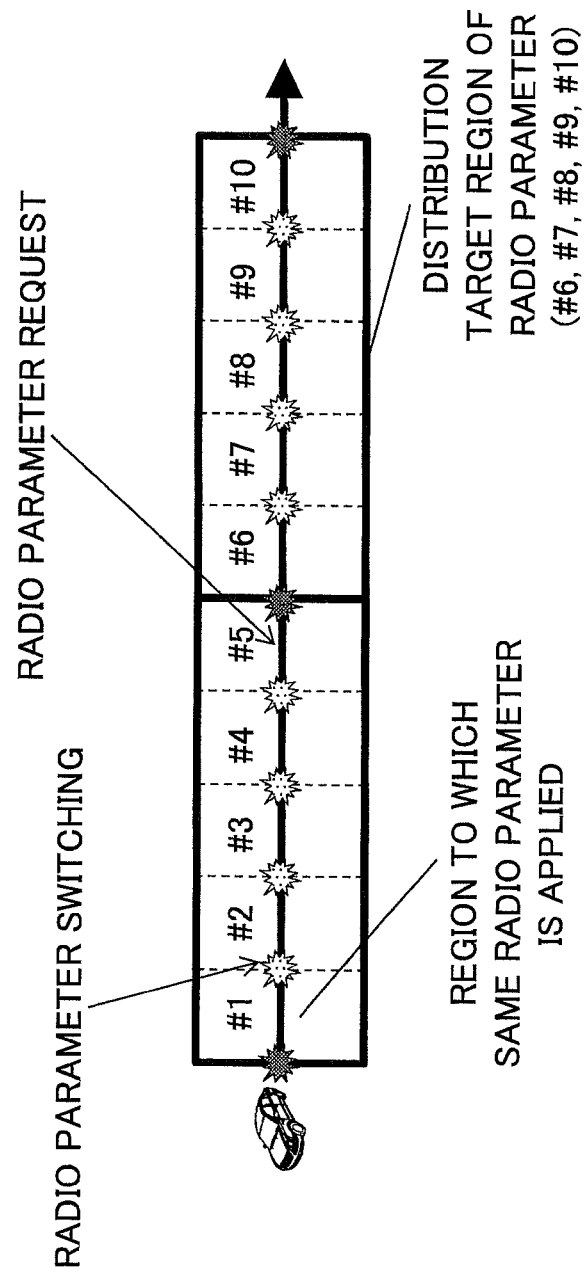

RADIO PARAMETER SWITCHING

RADIO PARAMETER SWITCHING

MONITORING TARGET

MONITORING TARGET

USER APPARATUS, BASE STATION, COMMUNICATION METHOD, AND INDICATION METHOD

TECHNICAL FIELD

The present invention relates to a user apparatus, a base station, a communication method, and an indication method.

BACKGROUND ART

In Long Term Evolution (LTE) and a succeeding system of LTE (for example, also referred to as LTE-Advanced (LTE-A), Future Radio Access (FRA), or 4G), device-to-device (D2D) technologies for enabling user terminals to perform direct communication without involving radio base stations have been examined (for example, Non-Patent Document 1).

D2D enables user apparatuses to communicate with each other even when traffic between the user apparatuses and base stations is reduced or communication with base stations is disabled in disasters.

D2D is broadly classified into D2D discovery (also referred to as D2D finding) for discovering other user terminals with which communication is enabled and D2D communication (also referred to as D2D direct communication, D2D communication, or inter-terminal direct communication) for enabling terminals to perform direct communication. Hereinafter, when the D2D communication and the D2D discovery are not particularly distinguished from each other, the D2D communication and the D2D discovery are simply referred to as D2D. Signals transmitted and received by D2D are referred to as D2D signals.

In 3rd Generation Partnership Project (3GPP), V2X has been examined to be realized by expanding D2D functions. Here, V2X is a part of intelligent transport systems (ITS) and is a general term for vehicle to vehicle (V2V) meaning a communication form performed between automobiles, vehicle to infrastructure (V2I) meaning a communication form performed between an automobile and a road-side unit (RSU) installed on a road side, vehicle to nomadic device (V2N) meaning a communication form performed between an automobile and a mobile terminal of a driver, and vehicle to pedestrian (V2P) meaning a communication form performed between an automobile and a mobile terminal of a pedestrian, as illustrated in FIG. 1.

CITATION LIST

Non-Patent Document

Non-Patent Document 1: "Key drivers for LTE success: Services Evolution", September 2011, 3 GPP, Internet URL: http://www.3gpp.org/ftp/Information/presentations/presentations2011/2011_09_LTE_Asia/2011_LTE_Asia_3GPP_Service_evolution.pdf.

SUMMARY OF THE INVENTION

Problem to be Solved by the Invention

In D2D of the related art, user apparatuses transmit and receive D2D signals using D2D radio parameters acquired via report information and RRC signals transmitted from base stations.

Here, in V2X, user apparatuses are assumed to transmit and receive D2D signals in radio networks while the user apparatuses are moving at a high speed. For example, as illustrated in FIG. 2, user apparatuses are assumed to be being moving while switching handover and RRC states (RRC idle or connected) between cells formed by a plurality of base stations and RSUs out of coverage.

In such radio network environments, it is necessary for user apparatuses to acquire and update D2D radio parameters every time when changing cells. When RRC states of a user apparatus are idle, base stations cannot indicate/transmit radio parameters to user apparatuses and it is necessary to transition the RRC states of the user apparatuses to connected states by temporarily performing paging. That is, in V2X in which user apparatuses are moving at a high speed, to indicate/transmit D2D radio parameters to the user apparatuses in accordance with the same methods as D2D of the related art is not efficient and is complex in communication method. The foregoing problem is not limited to V2X and may generally occur in D2D.

A technology of the present disclosure is devised in view of the foregoing circumstance and an object of the technology of the present disclosure is to provide a technology for efficiently indicating D2D radio parameters to user apparatuses.

Means for Solving Problem

According to the technology of the present disclosure, a user apparatus UE is a user apparatus in a radio communication system that supports D2D includes: an acquisition unit configured to acquire radio parameter information including a D2D radio parameter managed in a unit of a predetermined region including a plurality of cells from a base station; and a communication unit configured to transmit and receive a D2D signal using the D2D radio parameter in the predetermined region.

Effect of the Invention

According to the technology of the present disclosure, it is possible to provide a technology for efficiently indicating D2D radio parameters to user apparatuses.

BRIEF DESCRIPTION OF DRAWINGS

FIG. 8A is a diagram for describing a configuration example of D2D radio parameter information (region unit);
FIG. 8B is a diagram for describing a configuration example of D2D radio parameter information (a plurality of regions);
FIG. 8C is a diagram for describing a configuration example of D2D radio parameter information (all regions);

FIG. 9 is a diagram illustrating examples of radio parameters included in the D2D radio parameter information;

FIG. 15A is a diagram for describing a method of transmitting to the user apparatus D2D radio parameter information regarding a plurality of regions together;

MODE(S) FOR CARRYING OUT THE INVENTION

Hereinafter, embodiments of the invention will be described with reference to the drawings. Embodiments to be described below are merely examples and embodiments to which the invention is applied are not limited to the following embodiments. For example, a radio communication system according to the embodiments is assumed to be a system of a scheme confirming to LTE, but the invention is not limited to LTE and can also be applied to other schemes. In the present specification and the claims, "LTE" is used not only as a communication scheme corresponding to Release 8 or 9 of 3GPP but also as broad meanings including the 5th generation communication schemes corresponding to Releases 10, 11, 12, and 13 of 3GPP or releases after Release 14.

In the embodiments, V2X is mainly used as a target, but technologies related to the embodiments can be applied generally and broadly to D2D without being limited to V2X. "D2D" includes V2X as the meanings.

"D2D" includes not only a process procedure in which D2D signals are transmitted and received between user apparatuses UE but also a process procedure in which D2D signals are received (monitored) by a base station and a process procedure in which a user apparatus UE transmits an uplink signal to a base station eNB when the user apparatus UE is in an RRC idle or does not establish connection with the base station eNB.

<Overview of D2D>

Figure 1:
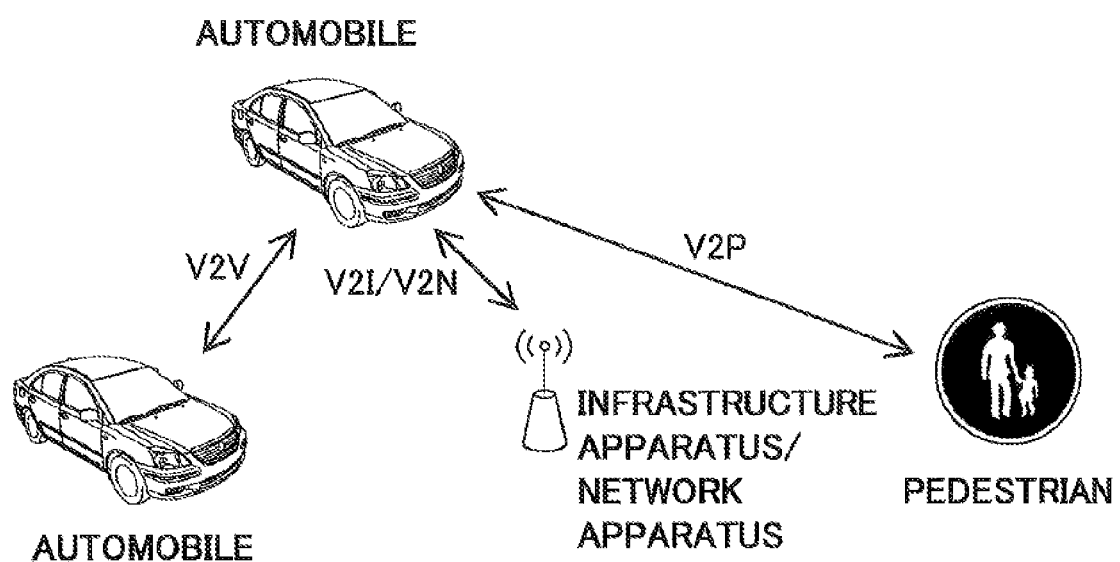
FIG. 1 is a diagram for describing V2X.
Figure 2:
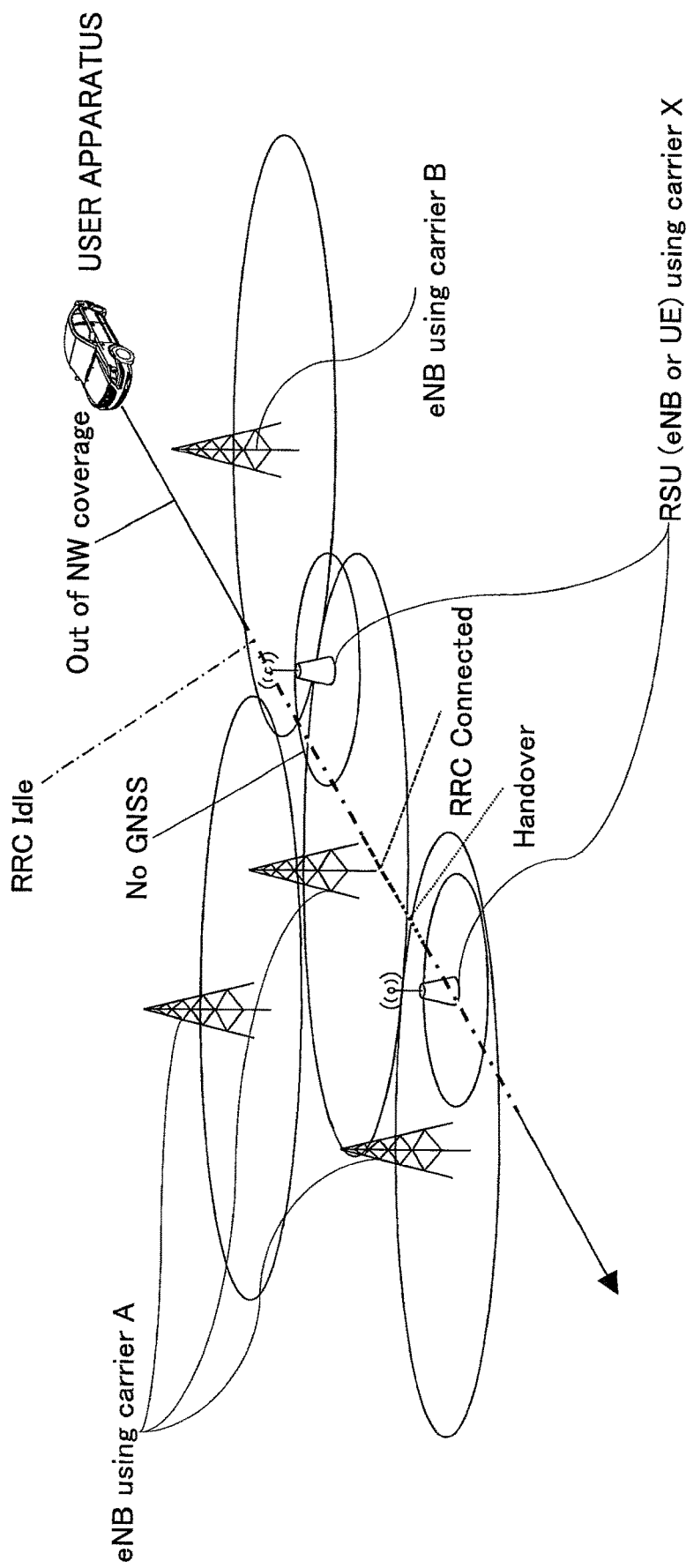
FIG. 2 is a diagram for describing a problem.
Figure 3A:
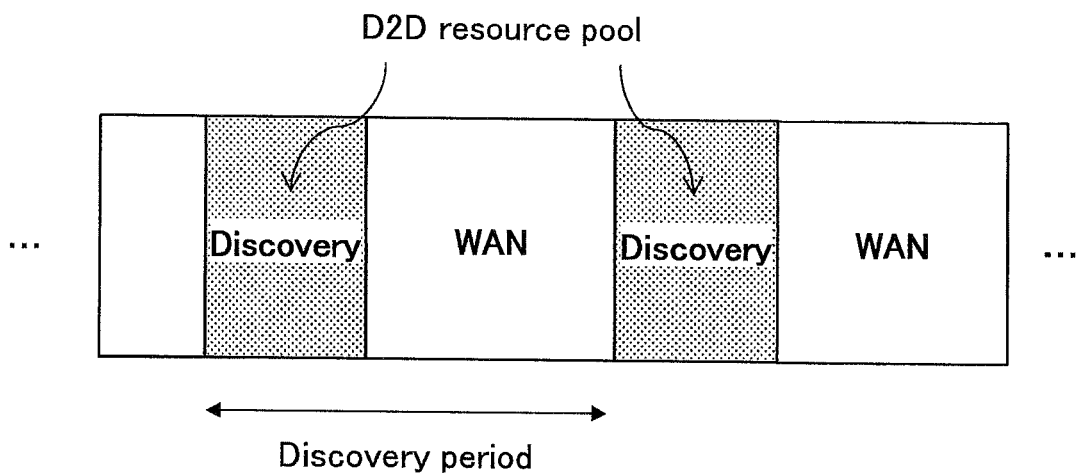
FIG. 3A is a diagram for describing D2D communication.

First, an overview of D2D regulated in LTE will be described. In D2D communication, some of the uplink resources already regulated as the resources of uplink signal transmission from the user apparatus UE to the base station eNB are used. In "discovery," as illustrated in FIG. 3A, a resource pool for a discovery message is ensured for each discovery period and a user apparatus UEa transmits the discovery message in the resource pool. More specifically, there are Type1 and Type2b. In Type1, the user apparatus UEa autonomously selects a transmission resource from the resource pool. In Type2b, quasi-static resources can be allocated via higher layer signaling (for example, RRC signal).

Figure 3B:
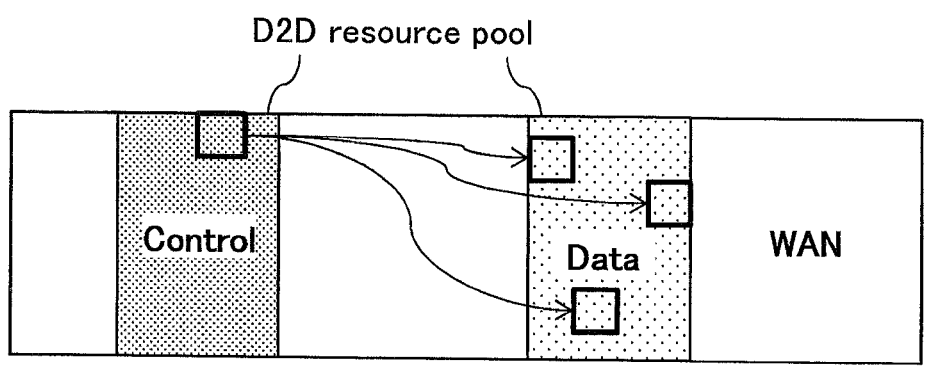
FIG. 3B is a diagram for describing the D2D communication.

In "communication," as illustrated in FIG. 3B, a control/data transmission resource pool is periodically ensured. The transmission side user apparatus UEa indicates a data transmission resource to a reception side user apparatus UEb in accordance with side link control information (SCI) using a resource selected from the control resource pool and transmits data using the data transmission resource. For the "communication", more specifically, there are Mode1 and Mode2. In Mode1, resources are dynamically allocated by (E)PDCCH transmitted from the base station eNB to the user apparatus UE. In Mode2, the user apparatus UEa autonomously selects a transmission resource from the control/data transmission resource pool. The resource pool which is indicated by SIB or defined in advance is used.

In LTE, a channel used for "discovery" is referred to as a physical side link discovery channel (PSDCH), a channel used to transmit control information such as SCI in "communication" is referred to as a physical side link control channel (PSCCH), and a channel used to transmit data is referred to as a physical side link shared channel (PSSCH).

Figure 4:
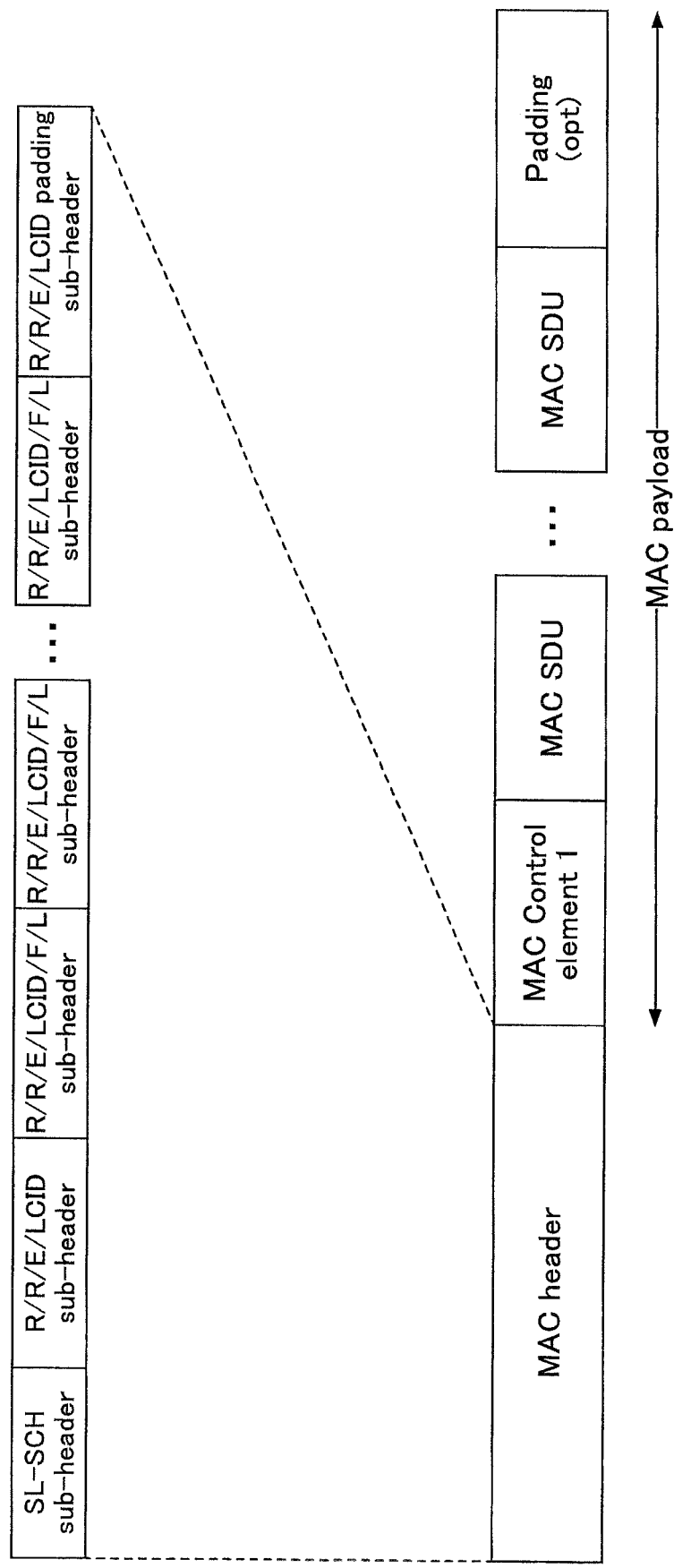
FIG. 4 is a diagram for describing MAC PDU used in the D2D communication.

A medium access control (MAC) protocol data unit (PDU) used for D2D communication is configured to include a MAC header, a MAC control element, a MAC service data unit (SDU), and padding, as illustrated in FIG. 4. The MAC PDU may include other information. The MAC header is configured to include one SL-side link shared channel (SCH) subheader and one or more MAC PDU subheaders.

Figure 5:
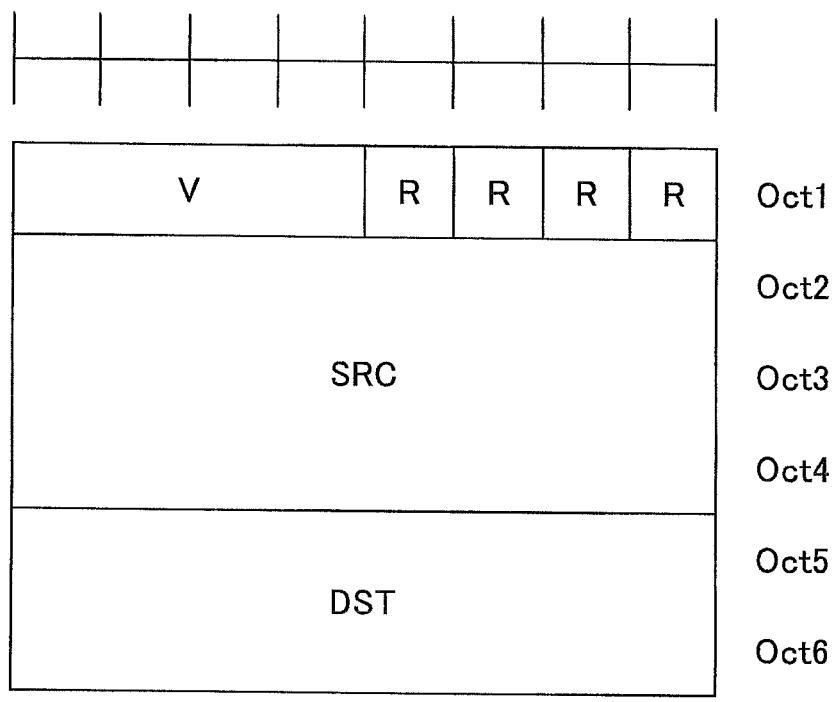
FIG. 5 is a diagram for describing a format of an SL-SCH subheader.

As illustrated in FIG. 5, the SL-SCH subheader is configured to include a MAC PDU format version (V), transmission source information (SRC), transmission destination information (DST), and a reserved bit (R). V is allocated to the beginning of the SL-SCH subheader and indicates the MAC PDU format version which is used by the user apparatus UE. Information regarding a transmission source is set in the transmission source information. An identifier regarding ProSe UE ID is set in the transmission source information. Information regarding a transmission destination is set in the transmission destination information. Information regarding ProSe Layer-2 Group ID of a transmission destination may be set in the transmission destination information.

In D2D, synchronization signals mainly used to synchronize user apparatuses UE located out of the coverage of a base station eNB are regulated and are referred to as a primary slidelink synchronization signal (PSSS) and a secondary slidelink synchronization signal (SSSS). A channel mainly used to transmit system information or the like to the user apparatus UE located out of the coverage of a base station eNB is referred to as a physical sidelink broadcast control channel (PSBCH).

<System Configuration>

Figure 6:
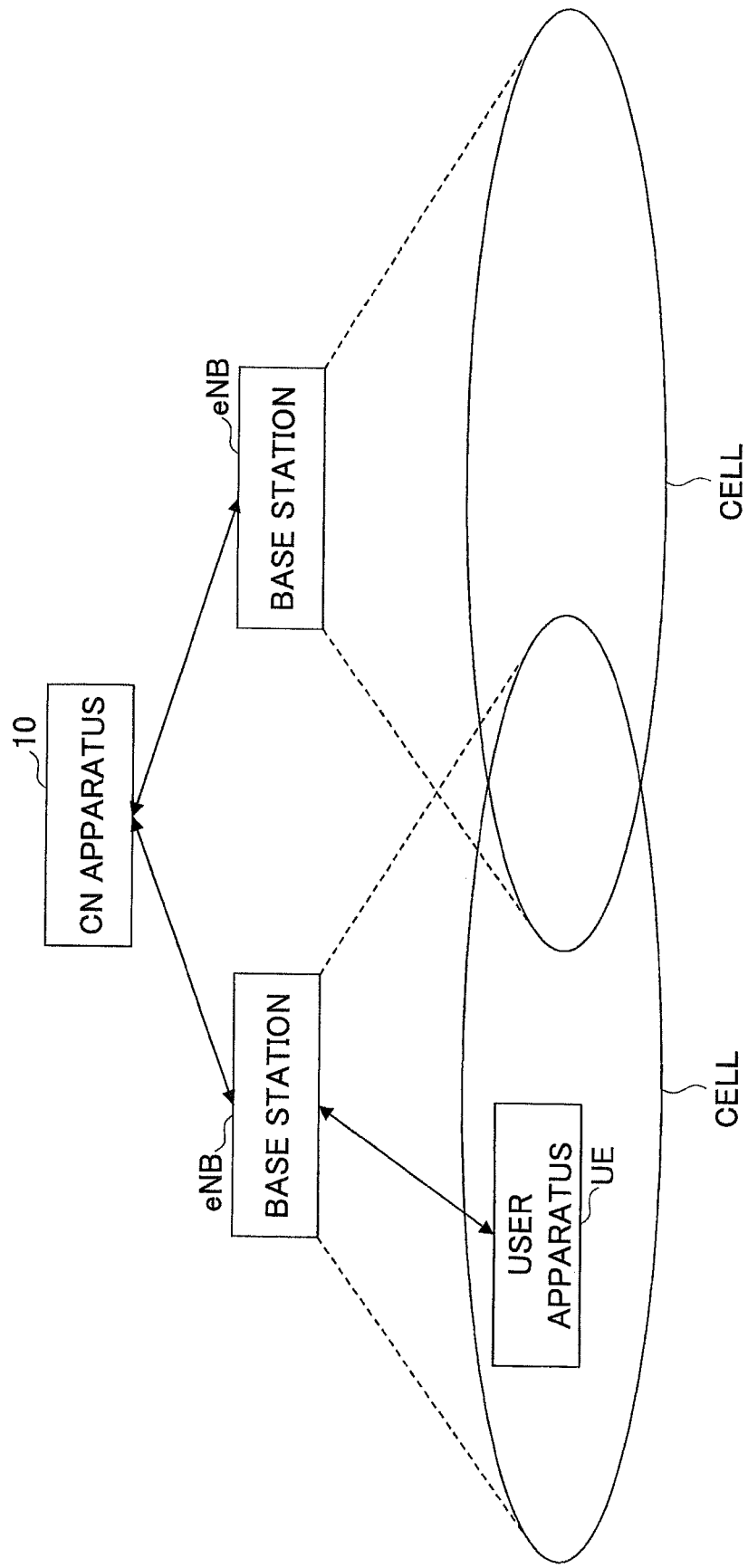
FIG. 6 is a diagram illustrating a configuration example of a radio communication system according to an embodiment.

FIG. 6 is a diagram illustrating a configuration example of a radio communication system according to an embodiment. As illustrated in FIG. 6, the radio communication system according to the embodiment includes a core network (CN) apparatus 10, base stations eNB, and a user apparatus UE.

The user apparatus UE includes an automobile regulated in V2X, a mobile terminal of a driver, and a mobile terminal of a pedestrian and has a cellular communication function and a D2D communication function.

The base station eNB has a cellular communication function and communicates with the user apparatus UE. In the embodiment, the base station eNB may have a D2D communication function. In the embodiment, the "base station eNB" is used to mean inclusion of an "RSU" (a base station type RSU or a user apparatus type RSU) unless otherwise mentioned.

The CN apparatus 10 is connected to the base station eNB and is a signal processing apparatus such as mobility management entity (MME) or a home subscriber server (HSS). The CN apparatus 10 may be a dedicated server that realizes an operation to be described in the embodiment. A proximity service (ProSe) function may be mounted on the CN apparatus 10.

<Region to which Same D2D Radio Parameters are Applied>

In D2D of the related art, the D2D radio parameters are basically managed in a base station eNB unit (cell unit). For example, information regarding a D2D resource pool includes report information and can be arbitrarily set in the base station eNB unit. For example, D2D radio resources allocated to the user apparatus UE are managed in the base station eNB unit.

In contrast, in the radio communication system according to the embodiment, D2D radio parameters are managed in an area unit with an area more appropriate to radio parameter setting than the cell unit, and thus, the D2D radio parameters are efficiently indicated to the user apparatus UE.

Figure 7A:
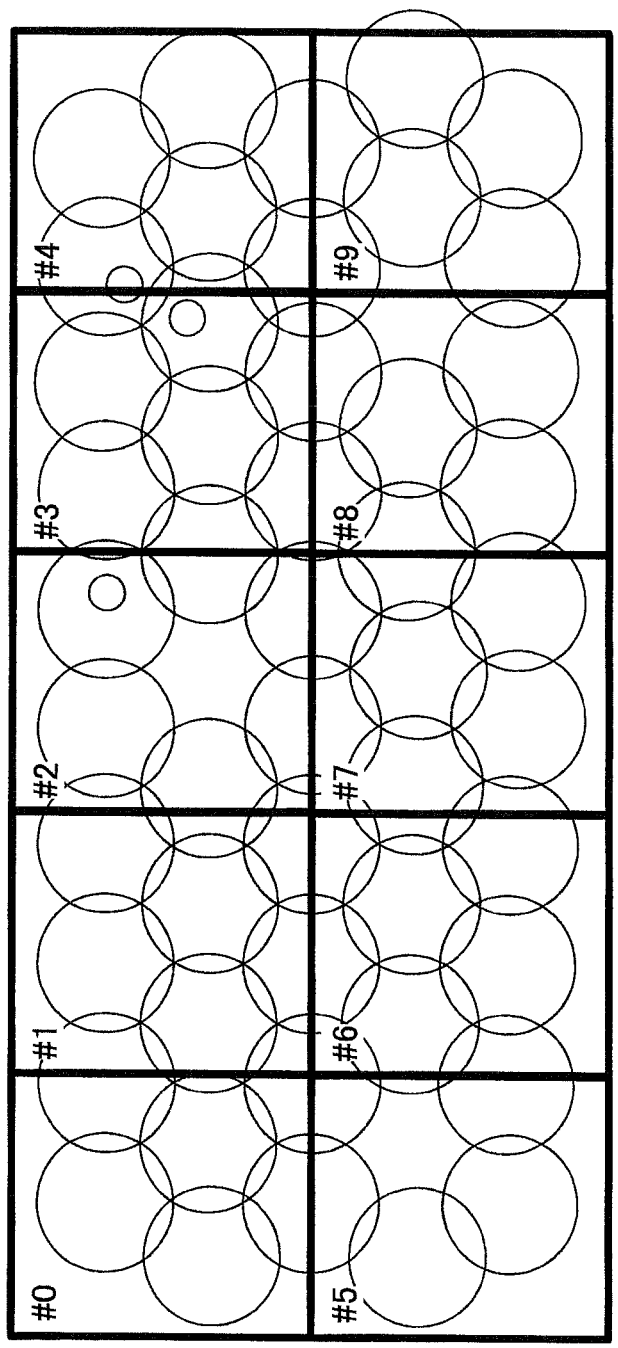
FIG. 7A is a diagram for describing a definition method for a region in which D2D radio parameters are managed.
Figure 7B:
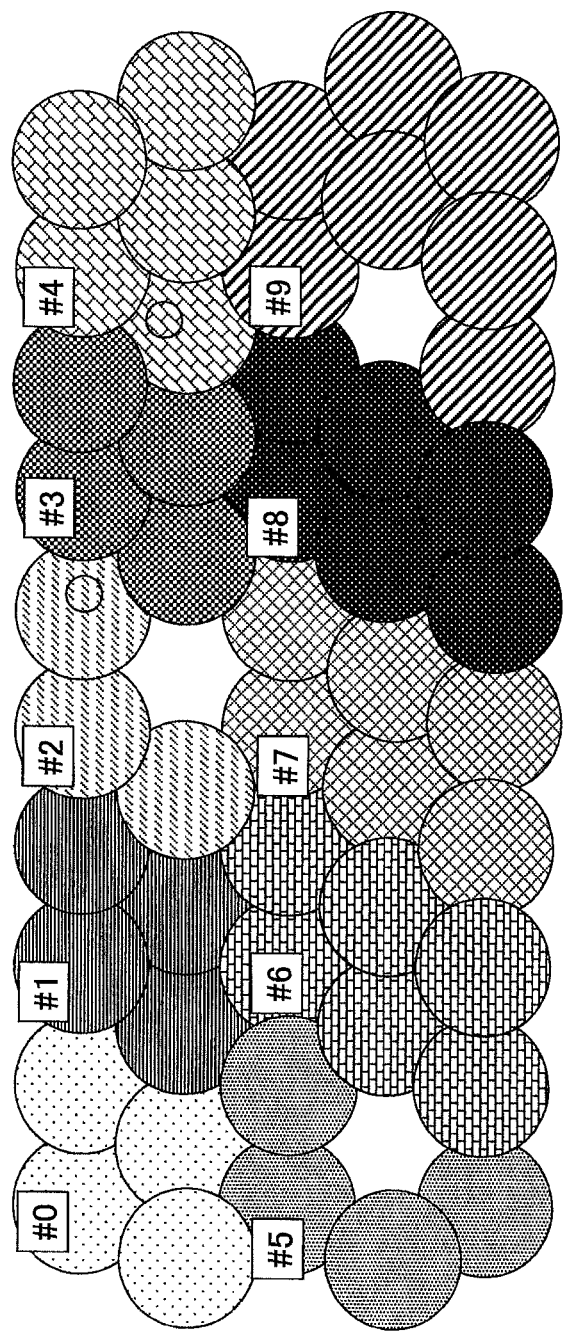
FIG. 7B is a diagram for describing a definition method for a region in which D2D radio parameters are managed.

FIGS. 7A and 7B are diagrams for describing definition methods for regions in which the D2D radio parameters are managed. In the embodiment, the regions in which the D2D radio parameters are managed may be defined as regions which are specified uniquely and geographically. Specifically, as illustrated in FIG. 7A, an entire radio network is defined as being partitioned into a plurality of geographic regions (#0 to #9 in the example of FIG. 7A). The range of each region may be specified with latitude and longitude. There is no restriction on the number of divisions.

In the embodiment, the regions in which the D2D radio parameters are managed may be defined as regions which are specified uniquely as a plurality of cells. Specifically, as illustrated in FIG. 7B, a cell in which the radio network is present is defined as being partitioned into a plurality of groups (#0 to #9 in the example of FIG. 7B). Each region may be specified with a list which bundles a physical cell ID. There is no restriction on the number of divisions.

The regions and tracking areas (TAs) may have one-to-one correspondence or the regions and TA lists may have one-to-one correspondence. The TA is a position registration area in LTE and is generally configured to include a plurality of cells. The TA list is a unit in which an MME tracks the position of the user apparatus UE and bundles the plurality of TAs. A tracking area identity (TAI) and a tracking area code (TAC) are assigned to each TA. Therefore, by associating each region with the TA or the TA list, it is possible to uniquely specify each region with the TAI or the TAC.

A radio parameter for each traveling state of the user apparatus UE may be decided in each region. For example, by setting the radio parameter in each traveling direction, it is possible to set an independent radio parameter between vehicles (between the user apparatuses UE) intersecting at an intersection. By setting the radio parameter for each speed, altitude, or traveling road, it is possible to set an independent radio parameter on a highway and a general road.

<Format Example of D2D Radio Parameter Information>

In the embodiment, the CN apparatus 10 or the base station eNB may generate information including the D2D radio parameters to be applied for each region (hereinafter referred to as "D2D radio parameter information") and the information may be indicated/transmitted to the user apparatus UE.

FIGS. 8A, 8B, and 8C are diagrams for describing format examples of D2D radio parameter information. As illustrated in FIG. 8A, the D2D radio parameter information includes a "region identifier" for uniquely identifying a region, a "region range" indicating the range of a region, and one or more "radio parameters" which is applied inside the region.

The "region identifier" may be any identifier as long as the region can be uniquely specified. For example, the region identifier may be indicated by a value such as #0 to #9 illustrated in the example of FIG. 7. When each region corresponds to the TA, the "region identifier" may be the TAI or the TAC. When each region corresponds to the TA list, the "region identifier" may be the TA list.

The "region range" may be any information as long as the region can be uniquely specified. When the region is a region which is specified uniquely and geographically, latitudes and longitudes indicating four spots of top right, top left, bottom right, and bottom left of the region may be stored. When the region is specified uniquely with a plurality of cells, the physical cell ID of each cell may be stored. When each region corresponds to the TA or the TA list, the "region range" may be omitted. This is because the user apparatus UE can ascertain a region in which the user apparatus UE is located since the report information includes the TAC.

Specifically, as will be described below, in the embodiment, the D2D radio parameter information regarding the plurality of regions may be collectively indicated/transmitted to the user apparatus UE. In this case, when there is a radio parameter commonly applied to a plurality of regions (or all the regions), as illustrated in FIGS. 8B and 8C, a format with which the radio parameter commonly applied to the plurality of regions (or all the regions) can be indicated/transmitted may be used. For example, when there is a radio parameter commonly set in regions #1 and #2, a data amount can be reduced more than when the radio parameter is stored with the format of FIG. 8A in each of regions #1 and #2 by storing #1 and #2 in the "region identifier list" of FIG. 8B and indicating/transmitting the radio parameter.

In the embodiment, the D2D radio parameter information may include the D2D radio parameters to be applied out of the coverage. In this case, for example, the user apparatus UE may be allowed to recognize the radio parameters applied out of the coverage by storing the identifier or the like indicating the outside of the coverage in the "region identifier" or the "region range."

In the embodiment, the D2D radio parameter information may include a "valid period" indicating a valid period. The user apparatus UE may drop the D2D radio parameter information exceeding the valid period and acquire the D2D radio parameter information in which a new valid period is set from the base station eNB or the CN apparatus 10.

<D2D Radio Parameters>

FIG. 9 is a diagram illustrating examples of radio parameters included in the D2D radio parameter information. "A carrier frequency and a bandwidth" indicates a carrier frequency and a bandwidth (SL (side link)-bandwidth) of carriers used to transmit and receive a D2D signal inside the region. When the user apparatus UE according to the embodiment transmits and receives the D2D signal, the D2D signal can be transmitted and received using the carriers of the uplink (UL) as in LTE of the related art.

A "resource pool configuration" indicates the configuration of a D2D resource pool applied inside the region. A "time/frequency hopping pattern" indicates a "time/frequency hopping pattern" applied when the D2D signal is transmitted inside the region. A "transmission power control parameter" indicates a parameter for controlling transmission power applied when the D2D signal is transmitted inside the region. This parameter may be, for example, a specific transmission power value or may be desired reception power "Po" and a coefficient "α" of a pass loss estimated value.

"Synchronization signal transmission setting" is information indicating a specific location to which a synchronization signal (for example, PSSS/SSSS) is transmitted. The specific location is a location, such as a tunnel entrance periphery, to which a synchronization signal is preferably transmitted toward the outside of the coverage (inside a tunnel) from the user apparatus UE. The user apparatus UE may transmit a synchronization signal according to the regulations of D2D of the related art to a cell end or the outside of the coverage regardless of "synchronization signal transmission setting."

"Synchronization signal reception setting" is information indicating a specific location in which the synchronization signal (for example, PSSS/SSSS) is monitored. The specific location is a location such as a tunnel in which a radio resource (a specific subframe, a specific monitor space, or the like) via which there is a possibility of a synchronization signal being transmitted is normally monitored, and thus, the synchronization signal transmitted from another user apparatus UE can be captured quickly.

A "reference signal configuration" indicates a mapping configuration of a reference signal (DM-RS or the like) to be included in the D2D signal transmitted inside the region.

"D2D radio resource allocation information" is information indicating allocation of the radio resources used when the D2D signal is transmitted inside the region. The user apparatus UE transmits the D2D signal using the radio resource indicated by the D2D radio resource allocation information.

A "synchronization reference carrier and cell ID list" is a list of carriers and cell IDs with which a synchronization timing signal is provided in the region. The user apparatus UE monitors a synchronization timing signal transmitted via the carriers and the cells and performs synchronization for transmitting and receiving the D2D signal. Only the list of the carriers may be indicated/transmitted without providing the cell IDs.

The above-described D2D radio parameters may be commonly transmitted from the base station eNB or the CN apparatus 10 to all the user apparatuses UE, or may be commonly transmitted to the user apparatuses UE in each group which is defined in advance. Alternatively, different parameters may be indicated/transmitted to each user apparatus UE. For example, when orthogonal radio resources are allocated between the user apparatuses UE present inside the region, different parameters are set for each user apparatus UE in the "D2D radio resource allocation information."

The above-described D2D radio parameters are merely examples. The D2D radio parameter information may not include all the radio parameters or may include different radio parameters.

<Indication of D2D Radio Parameter Information>

Next, a process procedure at the time of indicating/transmitting the D2D radio parameter information to the user apparatus UE will be described.

(Process Procedure (Part 1))

Figure 10:
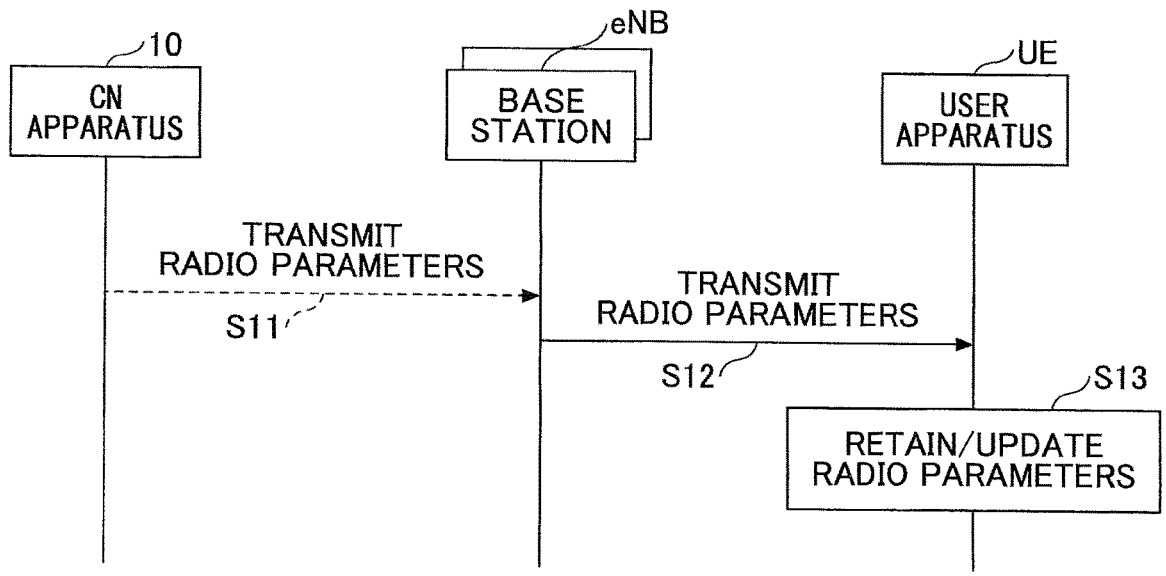
FIG. 10 is a sequence diagram illustrating a process procedure (part 1) when the D2D radio parameter information is transmitted to a user apparatus.

FIG. 10 is a sequence diagram illustrating a process procedure (part 1) when the D2D radio parameter information is transmitted to the user apparatus.

In step S11, the CN apparatus 10 transmits the D2D radio parameter information to be transmitted from the base station eNB to the base station eNB connected to the CN apparatus 10. The CN apparatus 10 appropriately selects and transmits the D2D radio parameter information for each base station eNB.

For example, when the regions are defined as in FIG. 7A, the CN apparatus 10 appropriately selects and transmits the D2D radio parameter information in such a manner that the D2D radio parameter information corresponding to region #0 is transmitted to the base station eNB forming a cell included in region #0 and the D2D radio parameter information corresponding to region #1 is transmitted to the base station eNB forming a cell included in region #1.

The CN apparatus 10 transmits the D2D radio parameter information corresponding to each of the plurality of regions to the base station eNB forming a cell across a plurality of regions. For example, when the regions are defined as in FIG. 7A, the CN apparatus 10 transmits the D2D radio parameter information corresponding to region #0 and the D2D radio parameter information corresponding to region

1 to the base station eNB forming a cell included in both regions #0 and #1. The D2D radio parameter information is not transmitted from the CN apparatus 10 to the base station eNB, but the D2D radio parameter information may be set in advance in the base station eNB using operation & maintenance (O&M) or the like. In this case, the process procedure of step S11 is omitted.

In Step S12, the base station eNB transmits the D2D radio parameter information to the user apparatus UE. The base station eNB may transmit the D2D radio parameter information using report information (SIB) or a multimedia broadcast multicast service (MBMS) or may transmit the D2D radio parameter information individually for each user apparatus UE using an RRC signal, a control channel of Layer 1 or Layer 2, or the like.

The base station eNB forming a cell across a plurality of regions collectively transmits the D2D radio parameter information corresponding to each of the plurality of regions.

In the process procedure of step S11, the CN apparatus 10 may transmit an NAS message including the D2D radio parameter information to the base station eNB. In the process procedure of step S12, the base station eNB may transmit (transfer) the NAS message received from the CN apparatus 10 to the user apparatus UE.

In step S13, the user apparatus UE extracts the region identifier, the region range, and the D2D radio parameters from the received D2D radio parameter information and retains the D2D radio parameters for each region. When the D2D radio parameters corresponding to the same region are retained in advance in a memory, the inside of the memory is updated with the extracted D2D radio parameters.

(Process Procedure (Part 2))

Figure 11:
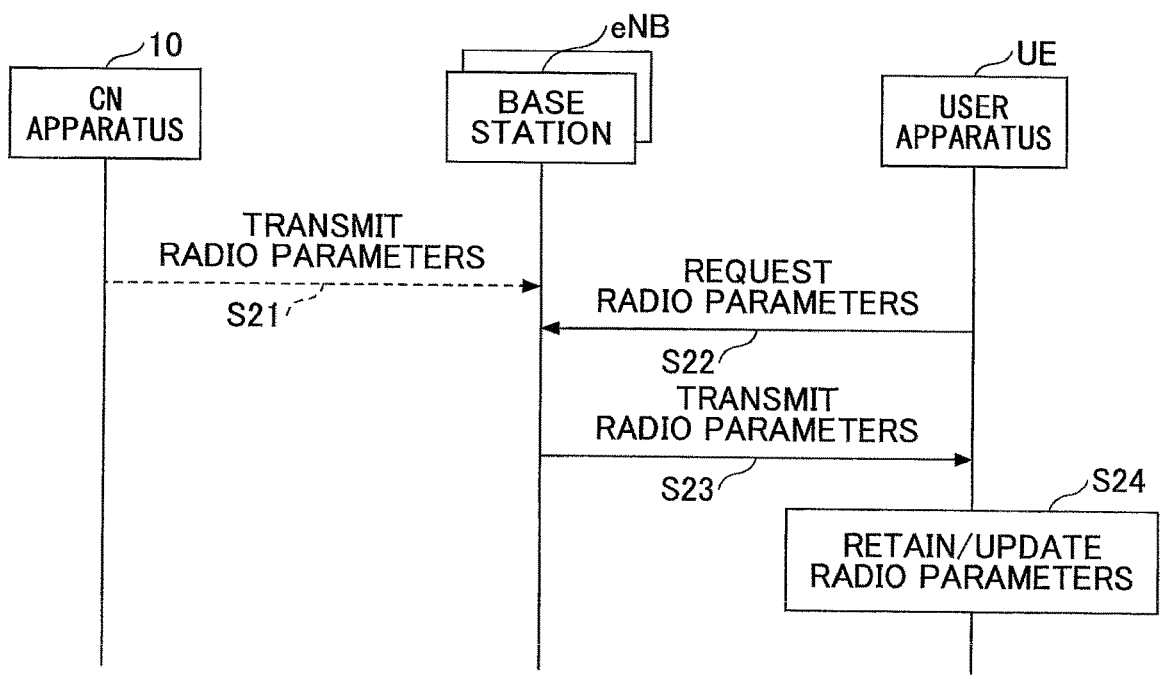
FIG. 11 is a sequence diagram illustrating a process procedure (part 2) when the D2D radio parameter information is transmitted to the user apparatus.

FIG. 11 is a sequence diagram illustrating a process procedure (part 2) when the D2D radio parameter information is transmitted to the user apparatus.

Since the process procedure of step S21 is the same as that of step S11 of FIG. 10, the description thereof will not be made.

In step S22, the user apparatus UE transmits a radio parameter request signal to the base station eNB to request the D2D radio parameter from the base station eNB. The radio parameter request signal may include information (for example, information used to request "transmission power control parameter") indicating a specific D2D radio parameter for requesting transmission from the base station eNB. The radio parameter request signal may include one or more "region identifiers." This is because a case is assumed in which the user apparatus UE is moving at a high speed and the D2D radio parameter information corresponding to a nearby region is desired to be acquired in advance.

In step S23, the base station eNB individually transmits the D2D radio parameter information including the D2D radio parameter requested from the user apparatus UE to the user apparatus UE using the RRC signal, the control channel of Layer 1 or Layer 2, or the like. When the radio parameter request signal includes one or more "region identifiers" and the D2D radio parameter information corresponding to the region identifiers is not retained, the base station eNB may inquire of the CN apparatus 10 about the D2D radio parameter information corresponding to the region identifiers and acquire the D2D radio parameter information.

Since the process procedure of step S24 is the same as that of step S13 of FIG. 10, the description thereof will not be made.

In the process procedure of step S22, the user apparatus UE may transmit the radio parameter request signal to the base station eNB using an NAS message and the base station eNB may transmit (transfer) the NAS message to the CN apparatus 10. The base station eNB may transmit (transfer) the NAS message received from the CN apparatus 10 and including the D2D radio parameter information to the user apparatus UE in the process procedure of step S23.

(Process Procedure (Part 3))

Figure 12:
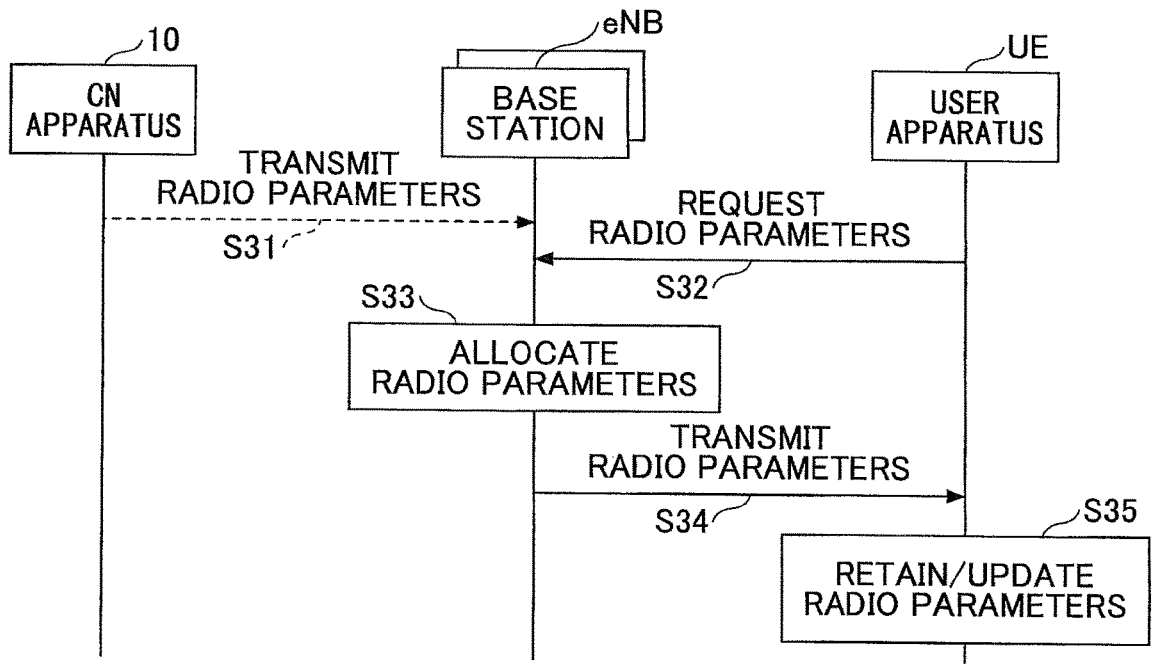
FIG. 12 is a sequence diagram illustrating a process procedure (part 3) when the D2D radio parameter information is transmitted to the user apparatus.

FIG. 12 is a sequence diagram illustrating a process procedure (part 3) when the D2D radio parameter information is transmitted to the user apparatus. The process procedure (part 3) is used when the base station eNB dynamically allocates the D2D radio parameters (for example, "D2D radio resource allocation information") in response to a request from the user apparatus UE.

In step S31, the CN apparatus 10 transmits information indicating the D2D radio parameter pool which can be allocated to the user apparatus UE in the region to the base station eNB connected to the CN apparatus 10. The D2D radio parameter pool is not transmitted from the CN apparatus 10 to the base station eNB, but the D2D radio parameter pool may be set in advance in the base station eNB using O&M or the like. In this case, the process procedure of step S31 is omitted.

In step S32, the user apparatus UE transmits a radio parameter request signal to the base station eNB. The radio parameter request signal may include information indicating a specific D2D radio parameter for requesting transmission from the base station eNB or may further include information (for example, latitude and longitude) indicating a detailed current position of the user apparatus UE inside the region.

In step S33, the base station eNB allocates the D2D radio parameters to the user apparatus UE which is a transmission source of the radio parameter request signal by selecting the radio parameters from the D2D radio parameter pool which can be allocated to the user apparatus UE inside the region.

In step S34, the base station eNB transmits the D2D radio parameter information including the allocated D2D radio parameters using the RRC signal, the control channel of Layer 1 or Layer 2, or the like to the user apparatus UE.

Since the process procedure of step S35 is the same as that of step S13 of FIG. 10, the description thereof will not be made.

(Process Procedure (Part 4))

Figure 13:
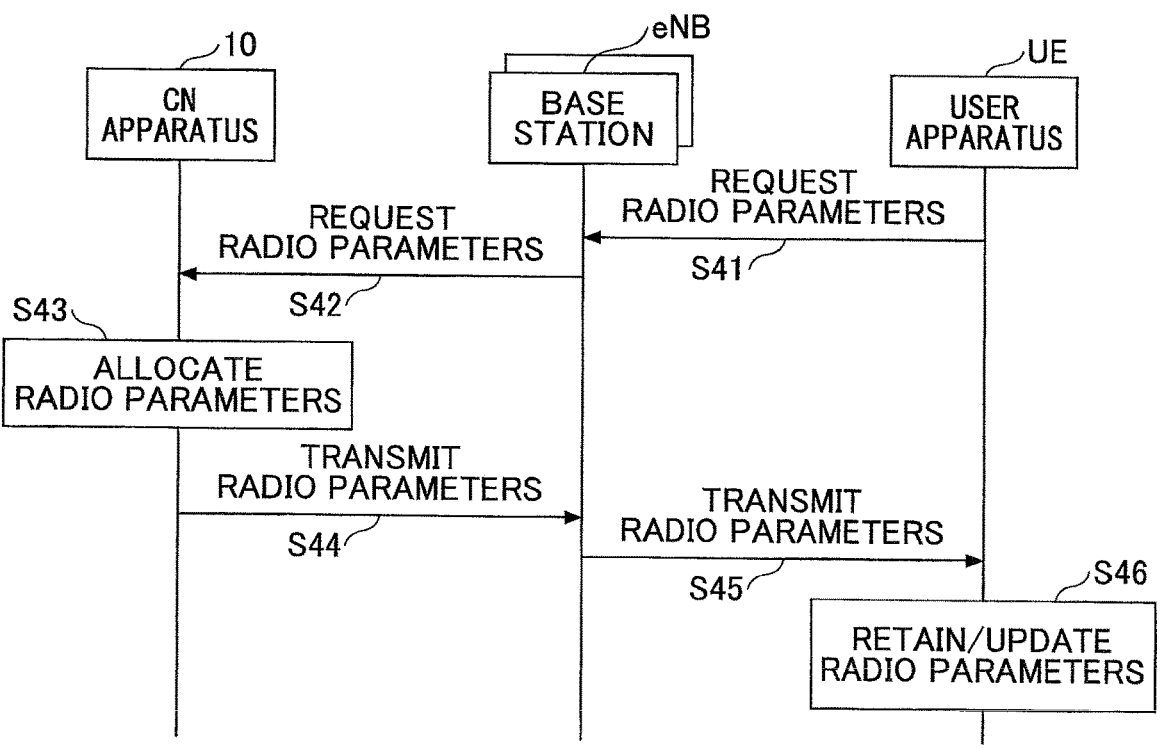
FIG. 13 is a sequence diagram illustrating a process procedure (part 4) when the D2D radio parameter information is transmitted to the user apparatus.

FIG. 13 is a sequence diagram illustrating a process procedure (part 4) when the D2D radio parameter information is transmitted to the user apparatus. The process procedure (part 4) is used when the CN apparatus 10 dynamically allocates the D2D radio parameters (for example, "D2D radio resource allocation information" in response to a request from the user apparatus UE. When the CN apparatus 10 dynamically allocates the D2D radio parameters, it is possible to realize the allocation of the radio parameters across the base stations eNB.

In step S41, the user apparatus UE transmits a radio parameter request signal to the base station eNB. The radio parameter request signal includes a region identifier of the region in which the user apparatus UE is located. The radio parameter request signal may include information indicating a specific D2D radio parameter for requesting transmission from the CN apparatus 10 along with the region identifier or may include information (for example, latitude and longitude) indicating a detailed current position of the user apparatus UE inside the region.

In step S42, the base station eNB transmits the radio parameter request signal to the CN apparatus 10.

In step S43, the CN apparatus 10 selects the D2D radio parameter pool which can be allocated to the user apparatus UE inside the region corresponding to the region identifier based on the region identifier included in the radio parameter request signal. The CN apparatus 10 allocates the D2D radio parameters to the user apparatus UE which is a transmission source of the radio parameter request signal by selecting the radio parameter from the pool.

In step S44, the CN apparatus 10 transmits the D2D radio parameter information including the allocated D2D radio parameter to the base station eNB. The CN apparatus 10 may include the D2D radio parameter information in the NAS message to transmit the D2D radio parameter information to the base station eNB.

In step S45, the base station eNB transmits the D2D radio parameter information (or the NAS message including the D2D radio parameter information) received from the CN apparatus 10 to the user apparatus UE using the RRC signal, the control channel of Layer 1 or Layer 2, or the like.

Since the process procedure of step S46 is the same as that of step S13 of FIG. 10, the description thereof will not be made.

(Process Procedure (Part 5))

Figure 14:
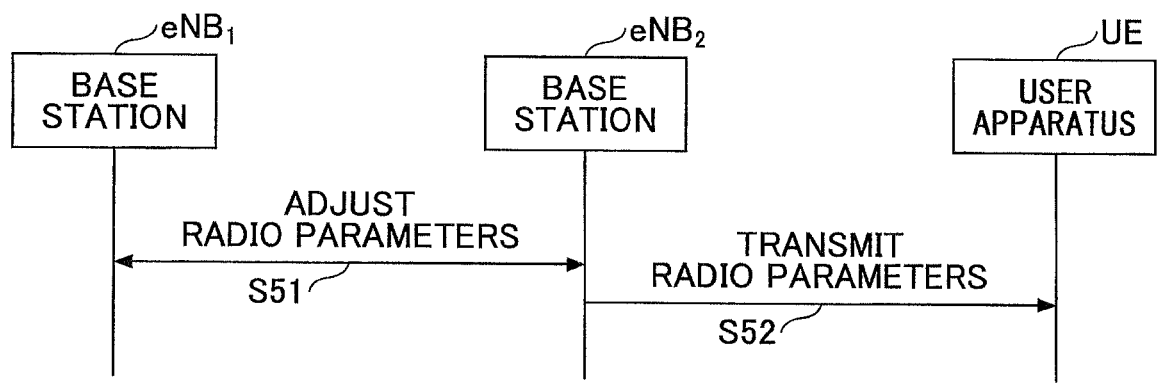
FIG. 14 is a sequence diagram illustrating a process procedure (part 5) when the D2D radio parameter information is transmitted to the user apparatus.

FIG. 14 is a sequence diagram illustrating a process procedure (part 5) when the D2D radio parameter information is transmitted to the user apparatus. The process procedure (part 5) is used to transmit the D2D radio parameter adjusted between the base stations eNB to the subsequent user apparatus UE.

In step S51, the D2D radio parameter to be indicated/transmitted to the user apparatus UE is adjusted between base stations $eNB_1$ and $eNB_2$. As an example of the adjustment of the radio parameter performed between the base stations $eNB_1$ and $eNB_2$, for example, the "transmission power control parameter" to be indicated/transmitted to the user apparatus UE is assumed to be adjusted in advance between the base stations eNB.

In step S52, the base station $eNB_2$ transmits the D2D radio parameter information including the D2D radio parameter adjusted in the process procedure of step S51 using the RRC signal, the control channel of Layer 1 or Layer 2, or the like to the user apparatus UE. When the adjusted D2D radio parameters can be commonly indicated/transmitted to the user apparatuses UE inside the region, the base station eNB may transmit the D2D radio parameter information using the report information (SIB) or the MBMS.

<Acquisition and Update Timing of D2D Radio Parameters>

The user apparatus UE according to the embodiment uniquely specify the region in which the user apparatus UE is located by frequently acquiring the latitude/longitude of the location in which the user apparatus UE is located, TAC, or the physical cell ID from the GPS, the report information, or the like and performs D2D communication using the D2D radio parameter corresponding to the specified region. Therefore, when the user apparatus UE moves across the regions and the D2D radio parameters corresponding to the region of the movement destination are not retained, the D2D radio parameter information corresponding to the region of the movement destination may be acquired in accordance with the above-described process procedures (parts 1 to 5).

When the user apparatus UE moves by a predetermined distance from the position at which the D2D radio parameter information is previously acquired, the user apparatus UE may acquire the D2D radio parameter information in accordance with the above-described process procedures (parts 1 to 5). When a given time elapses after the previous acquisition of the D2D radio parameter information, the user apparatus UE may acquire the D2D radio parameter information in accordance with the above-described process procedures (parts 1 to 5).

The user apparatus UE may acquire the D2D radio parameter information at a timing at which movement from the outside of the coverage to the inside of the coverage is detected in accordance with the above-described process procedures (parts 1 to 5). When a change in a traffic amount exceeds (or equal to or less than) a predetermined threshold, for example, the size of a message to be transmitted via the D2D signal is changed, the user apparatus UE may acquire the D2D radio parameter information in accordance with the above-described process procedures (parts 1 to 5).

When the user apparatus UE performs position registration or performs handover, the user apparatus UE may acquire the D2D radio parameter information in accordance with the above-described process procedures (parts 1 to 5). When a valid period of the D2D radio parameter information elapses, the user apparatus UE may acquire the D2D radio parameter information in accordance with the above-described process procedures (parts 1 to 5) and update the D2D radio parameter stored in the memory.

(Indication of D2D Radio Parameter Information of Plurality of Regions)

The base station eNB or the CN apparatus 10 may collectively indicate/transmit to the user apparatus UE the D2D radio parameter information related to the plurality of regions. For example, the base station eNB may indicate/transmit to the user apparatus UE not only the D2D radio parameter information related to the region to which the base station eNB belongs but also the D2D radio parameter information related to a peripheral region via the report information or the MBMS. Thus, when the user apparatus UE is moving at a high speed and crosses over each region, it is not necessary for the user apparatus UE to acquire the D2D radio parameter information, and thus a processing load is reduced.

To avoid an increase in the data amount of the D2D radio parameter information transmitted via the report information or the MBMS, only the D2D radio parameter information related to the region to which the base station eNB belongs is transmitted via the report information or the MBMS. Only when a radio parameter request signal including the region identifier is received from the user apparatus, the base station eNB (or the CN apparatus 10) may indicate/transmit to the user apparatus UE the D2D radio parameter information including the D2D radio parameter information related to the region indicated by the region identifier and the peripheral region of the region.

The user apparatus UE may include a traveling state (movement state) such as a current position (latitude and longitude), a movement speed, and a movement direction of the user apparatus UE in the radio parameter request signal in addition to the region identifier or instead of the region identifier and transmit the radio parameter request signal to the base station eNB or the CN apparatus 10. Thus, for example, as illustrated in FIG. 15A, the base station eNB or the CN apparatus 10 can estimate a movement direction of the user apparatus UE and indicate/transmit to the user apparatus UE collectively the D2D radio parameter information of the plurality of regions (regions #6 to #10 in the example of FIG. 15A) in the estimated movement direction.

Figure 15B:
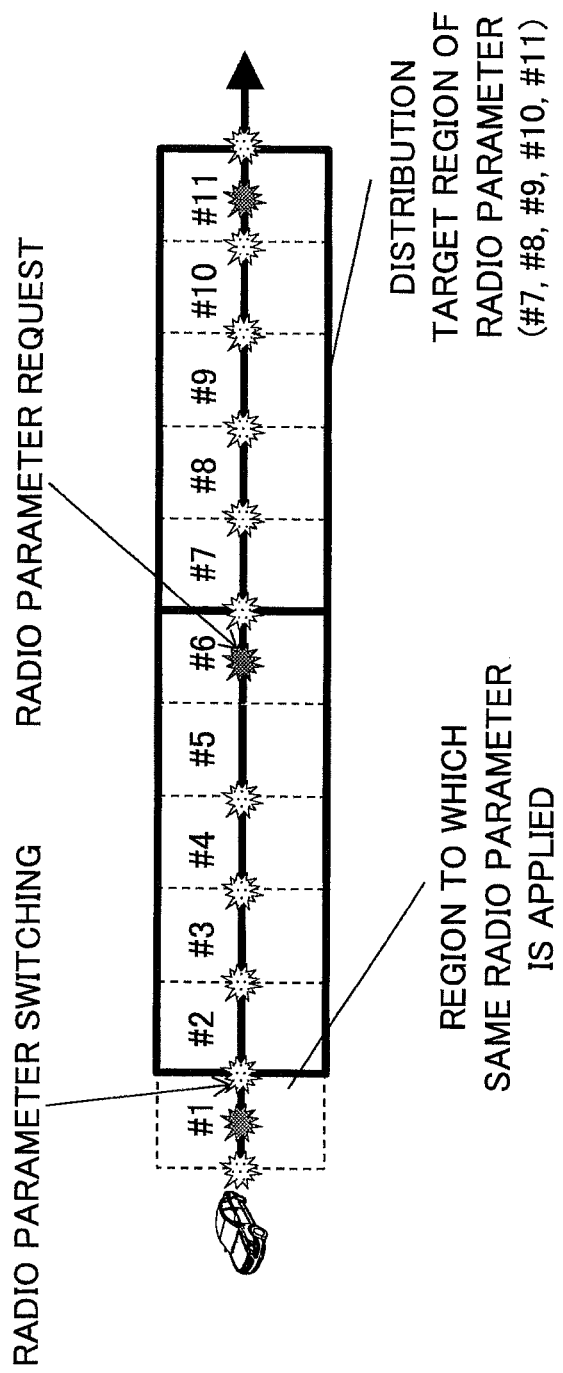
FIG. 15B is a diagram for describing a method of transmitting to the user apparatus D2D radio parameter information regarding a plurality of regions together.

As illustrated in FIG. 15B, the user apparatus UE may transmit a radio parameter request signal to the base station eNB or the CN apparatus 10 before the user apparatus UE crosses a region (for example, the vicinity of the center of the region). Thus, the base station eNB or the CN apparatus 10 can indicate/transmit to the user apparatus UE the D2D radio parameter information in proper time and the user apparatus UE can avoid an acquisition delay of the D2D radio parameter information.

<Application Boundary of D2D Radio Parameter>

Figure 16A:
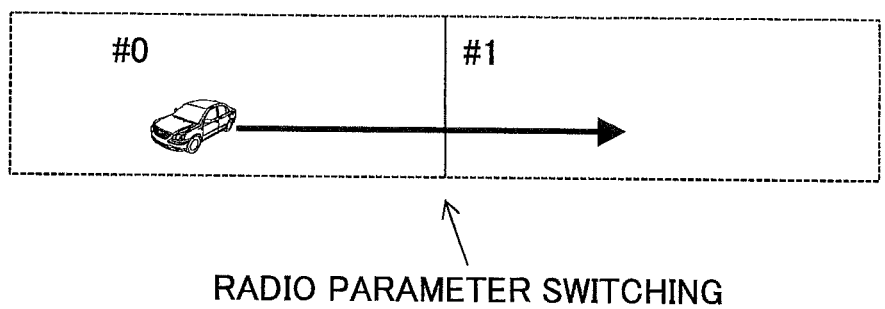
FIG. 16A is a diagram for describing an example of a switch timing of radio parameters.

The user apparatus UE according to the embodiment performs the D2D communication using the D2D radio parameter corresponding to the region at which the user apparatus UE is located, as illustrated in FIG. 16A. Therefore, when the D2D signal is transmitted and received at a timing at which the user apparatus UE crosses over the region, the D2D radio parameter is switched during the transmission and the reception of the D2D signal.

Figure 16B:
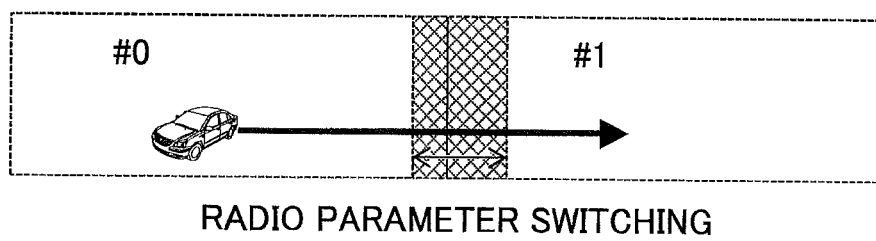
FIG. 16B is a diagram for describing an example of a switch timing of radio parameters.

Accordingly, in the embodiment, as illustrated in FIG. 16B, the D2D radio parameter to be applied may be permitted to be duplicated in a specific range in the boundary of the regions. Specifically, the user apparatus UE moving from region #0 to region #1 may continuously perform a process of transmitting and receiving the D2D signal according to the D2D radio parameter corresponding to region #0 within the specific range. The user apparatus UE moving from region #1 to region #0 may continuously perform a process of transmitting and receiving the D2D signal according to the D2D radio parameter corresponding to region #1 within the specific range.

As another method, even when the user apparatus UE crosses the region, the user apparatus UE may continue the process of transmitting and receiving the D2D signal according to the D2D radio parameter corresponding to the previous region within only a predetermined time.

As still another method, the user apparatus UE may continue the process of transmitting the D2D signal according to the D2D radio parameter corresponding to the previous region until transmission of data in a unit (1 MAC PDU or the like) is completed even when the user apparatus UE crosses over the region.

<Method of Indication to User Equipment in RRC IDLE>

According to the embodiment, the D2D radio parameter information is transmitted to the user apparatus UE in accordance with the above-described process procedures (parts 1 to 5).

Here, assume a case in which the base station eNB or the CN apparatus 10 desires to transmit to a specific user apparatus UE the D2D radio parameter dedicated for the specific user apparatus UE. As a specific example, for example, assume a case in which the base station eNB or the CN apparatus 10 desires to forcibly change the D2D radio resource temporarily allocated to a specific user apparatus UE as some reason. In this case, when the RRC state of the specific user apparatus UE is idle, it is necessary for the CN apparatus 10 to invoke the user apparatus UE by instructing the base station eNB to perform paging and to establish connection between the base station eNB and the specific user apparatus UE (transition the idle state to the RRC connected state). That is, the process procedure may be complicated.

On the other hand, the D2D radio parameter information dedicated for the specific user apparatus UE can also be considered to be included in a paging message. In the specification of LTE, a small amount of data (specifically, only IMSI or S-TMSI) can be set in the paging message and it is difficult to include the D2D radio parameter information in the paging message in the current state.

(Method of Indicating D2D Radio Parameter Information (Part 1))

In the embodiment, for the user apparatus UE in the RRC idle state to be able to receive the D2D radio parameter information, the user apparatus UE monitors a pre-decided radio resource regardless of whether the RRC state is idle. The base station eNB indicates/transmits to the specific user apparatus UE the D2D radio parameter information using the pre-decided radio resource.

The pre-decided radio resource may be a subframe of a cell in which the user apparatus UE resides or may be a subframe of specific carriers (carriers designated as a monitoring target). The base station eNB or the CN apparatus 10 may indicate/transmit to the user apparatus UE the specific carriers in advance or the specific carriers may be set in advance in a universal subscriber identity module (USIM).

The pre-decided radio resource may be able to be specified by performing modulo calculation on the radio frame number or/and the subframe number with a predetermined identifier. The predetermined identifier may be information (a region identifier, a physical cell ID, a TAI, a TAC, or the like) indicating a UE ID, a temporary ID allocated from the base station eNB or the CN apparatus 10, or a current position of the user apparatus UE.

Figure 17A:
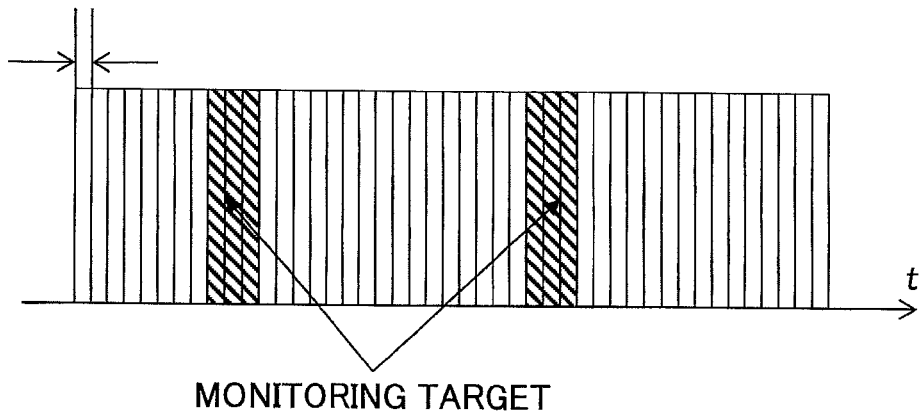
FIG. 17A is a diagram for describing a method of indicating radio parameters to the user apparatus in RRC IDLE.

FIGS. 17A, 17B, 18A, and 18B are diagrams for describing a method of indicating/transmitting to the user apparatus in RRC IDLE radio parameters. For example, as illustrated in FIG. 17A, the user apparatus UE may periodically monitor one subframe or a plurality of subframes decided in advance and the base station eNB may store the D2D radio parameter information dedicated for the specific user apparatus UE in the monitoring target subframe.

Figure 17B:
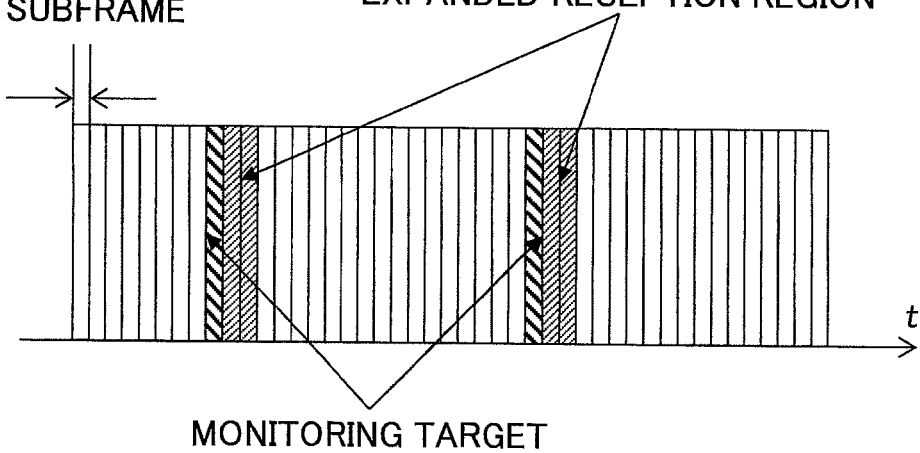
FIG. 17B is a diagram for describing the method of indicating radio parameters to the user apparatus in RRC IDLE.

As illustrated in FIG. 17B, the user apparatus UE may periodically monitor the pre-decided subframe and the base station eNB may store the D2D radio parameter information dedicated for the specific user apparatus UE in an expanded reception region and store information (time and frequency resources of the expanded reception region, a search space including the DCI corresponding to the expanded reception region, or RNTI used to perform CRC masking on the DCI) regarding the expanded reception region in the monitoring target subframe. The example of FIG. 17A can be applied mainly when a data amount of the D2D radio parameter information is small. The example of FIG. 17B can be applied mainly when a data amount of the D2D radio parameter information is small.

Figure 18A:
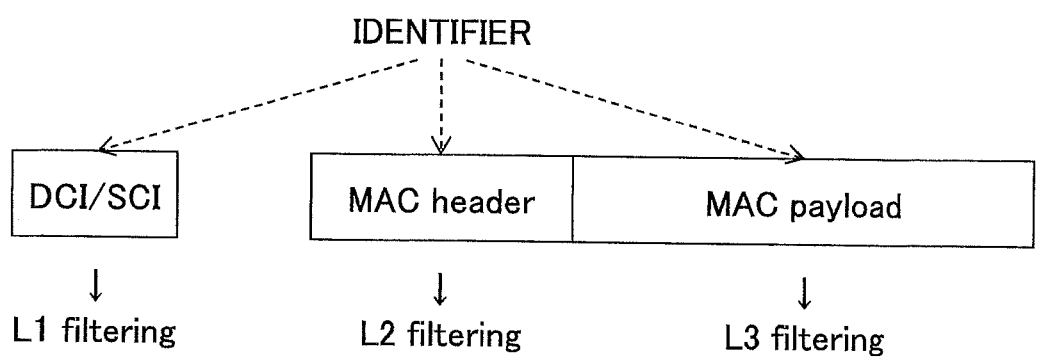
FIG. 18A is a diagram for describing the method of indicating radio parameters to the user apparatus in RRC IDLE.

When it is detected in the monitoring target radio resource that the specific identifier is included in DCI (SCI), a MAC header, or a MAC payload, as illustrated in FIG. 18A, the user apparatus UE may determine that the D2D radio parameter information destined for the user apparatus UE is included in the radio resource. The specific identifier may be the UE ID or may be a group ID (group destination ID) allocated for each group of the specific user apparatus UE. When the specific identifier is included in DCI (SCI), the user apparatus UE can determine that the D2D radio parameter information destined for the user apparatus UE is included in the radio resource at a time point at which signal processing of Layer 1 is performed. When the specific identifier is included in the MAC header, the user apparatus UE can determine that the D2D radio parameter information destined for the user apparatus UE is included in the radio resource at a time point at which signal processing of Layer 2 is performed. When the specific identifier is included in the MAC payload, the user apparatus UE can determine that the D2D radio parameter information destined for the user apparatus UE is included in the radio resource at a time point at which signal processing of Layer 3 is performed.

Figure 18B:
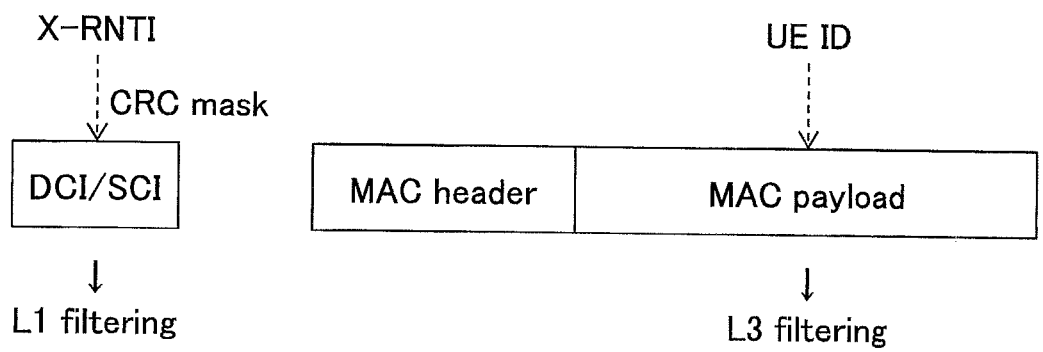
FIG. 18B is a diagram for describing the method of indicating radio parameters to the user apparatus in RRC IDLE.

When it is detected in the monitoring target radio resource that the DCI is subjected to CRC masking with specific RNTI (X-RNTI) and it is further detected that the UE ID of the user apparatus UE is included in the MAC payload, as illustrated in FIG. 18B, the user apparatus UE may determine that the D2D radio parameter information destined for the user apparatus UE is included in the monitoring target radio resource. The specific RNTI (X-RNTI) may be, for example, a fixed value which is common to the user apparatuses UE and indicates that the D2D radio parameter information is included in the PDSCH (or the PSSCH).

When the base station eNB transmits the D2D radio parameter information to the user apparatus UE in the RRC idle state, the base station eNB may include only a parameter of a subset including a specific parameter (a parameter desired to be transmitted to the user apparatus UE) among the plurality of radio parameters described in FIG. 9 in the D2D radio parameter information to transmit the parameter or may include only the specific parameter in the D2D radio parameter information to transmit the specific parameter. Thus, a signaling overhead is reduced (a signaling data amount is reduced).

(Method of Indicating D2D Radio Parameter Information (Part 2))

In the embodiment, to be able to indicate to a user apparatus UE in the RRC idle state the D2D radio parameter information, the CN apparatus 10 may instruct the base station eNB to transmit a paging message including a special flag. When the special flag is included in the paging message, the user apparatus UE operates to receive the D2D radio parameter information from the base station eNB without performing RRC connection and NAS connection.

When the special flag is transmitted via the paging message, the special flag may be included in the paging message (that is, the MAC payload), the special flag may be included in a MAC header of the paging message, or the special flag may be included in the DCI. The DCI including the special flag may be subjected to the CRC masking with the specific RNTI. The user apparatus UE may be implicitly indicated that the paging message is a paging message for indicating the D2D radio parameter information by transmitting the paging message used to indicate the D2D radio parameter information using a radio resource different from a normal paging message.

As another example, RNTI valid for a given time may be included in the paging message and the D2D radio parameter information may be included in the subframe in the given time. The RNTI may be subjected to the CRC masking of the DCI. A subframe number included in the time in which the RNTI is valid or the D2D radio parameter information may be included in the paging message.

In the specification of LTE, only a small amount of data is set in the paging message. A data size which can be set in the paging message may be expanded and the D2D radio parameter information may be included in the paging message.

<Allocation of D2D Radio Resources>

(Method of Specifying Radio Resources Available by User Equipment)

In the embodiment, the user apparatus UE transmits the D2D signal using the radio resource indicated by the "D2D radio resource allocation information" included in the D2D radio parameter information. However, instead, the radio resource available to transmit the D2D signal may be configured to specify the user apparatus UE.

Figure 19:
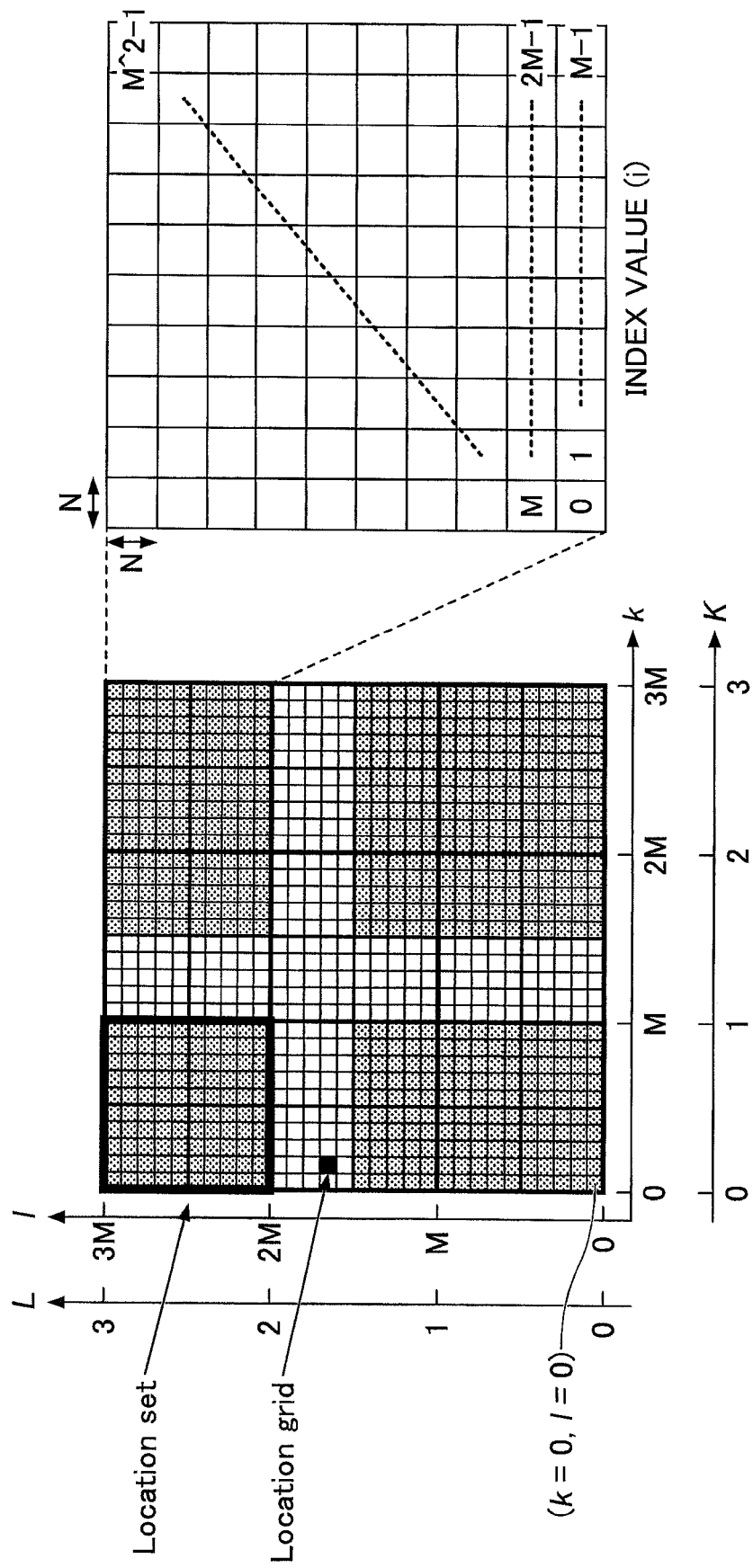
FIG. 19 is a diagram for describing a method of specifying radio resources by the user apparatus.

FIG. 19 is a diagram for describing a method of specifying radio resources by the user apparatus. In the embodiment, as illustrated in FIG. 19, a predetermined geographic range is partitioned into location grids in a lattice form. The predetermined geographic range may be the same the region illustrated in FIG. 7A or may be a range including a plurality of regions.

In the embodiment, the radio resources (time resources and frequency resources) available for each location grid may be uniquely allocated, and map information indicating the radio resource allocated in advance for each location grid may be included in the "D2D radio resource allocation information" so that the map information is transmitted to the user apparatus UE. Thus, the user apparatus UE can specify an available radio resource according to the location grid in which the user apparatus UE is located. Further, the allocated radio resources (the time resources and the frequency resources) may be uniquely specified (calculated) from coordinate values of the location grids. Information (a calculation equation, a parameter used for the calculation equation, or the like) necessary to specify (calculate) the radio resource (the time resources and the frequency resources) from the coordinate values of the location grids may be included in the "D2D radio resource allocation information", and the base station eNB or the CN apparatus 10 indicates to the user apparatus UE the information. It is possible to reduce an information amount of the "D2D radio resource allocation information."

Here, since the orthogonal resources are finite, it is difficult to allocate the orthogonal radio resources to all the location grids, the radio resources may be duplicated between nearby location grids, and thus there is a possibility of interference occurring.

Accordingly, for example, as illustrated in FIG. 19, a location set bundling a plurality of location grids may be defined and the radio resource allocated for each location grid may be periodically hopped (changed) in a unit of the location set.

First, each location grid is represented by a coordinate index (k, l) partitioned in an N meter unit. In the example of FIG. 19, a coordinate index (K, L) of a bottom left location grid partitioned an M×N meter unit is (k=0, l=0). Further, a location set is represented by the coordinate index (K, L) portioned in the M×N meter unit. In the example of FIG. 19, the coordinate index of the bottom left location set is (K=0, L=0).

Next, an index value (i) for uniquely identifying the location grid is given to each of all the location grids in the location set. The index value (i) is expressed in the following equation. The right drawing of FIG. 19 illustrates the index value (i) that is given to each location grid expressed in the following equation.

$$i=(k \bmod M)+k*(l \bmod M)*M \quad \text{[Equation 1]}$$

In the location grid (k, l), a radio resource index (R) of a predetermined time (t) is represented in the following equation. The radio resource index (R) is an index that is given to each of the radio resources which are allocated in advance and the radio resources (available) allocated from the values of the indexes are uniquely specified. That is, the user apparatus UE decides the radio resources available to transmit the D2D signal at the time (t) by obtaining the value of the radio resource index (R) at the time (t) using the following equation.

$$R(k,l,t)=\{i+f(K,L,\text{floor}(t/T))\} \bmod A \quad \text{[Equation 2]}$$

Figure 20A:
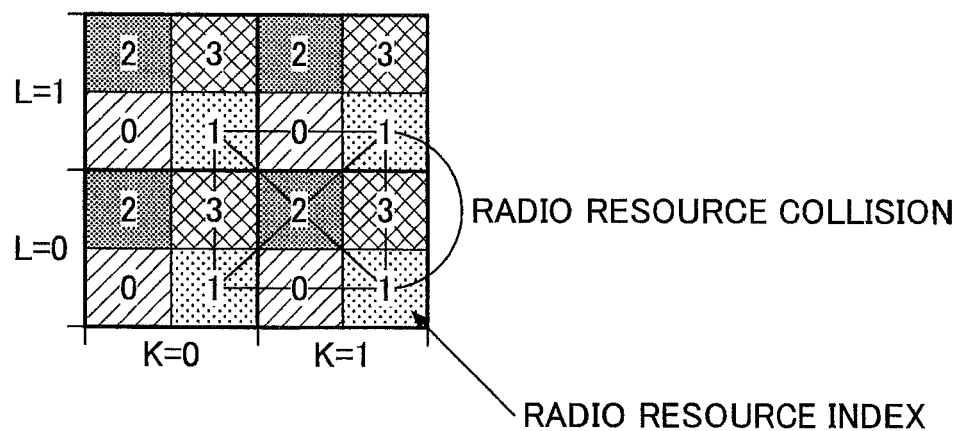
FIG. 20A is a diagram for describing a method of specifying radio resources by the user apparatus.
Figure 20B:
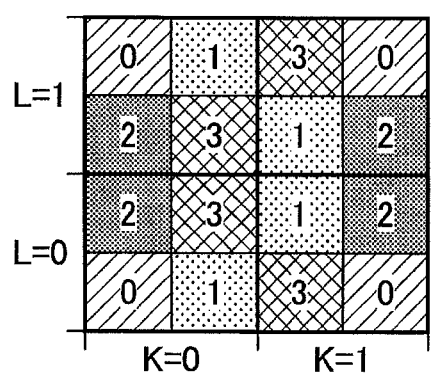
FIG. 20B is a diagram for describing a method of specifying radio resources by the user apparatus.

R: radio resource index
t: time at the time of resource calculation
T: hopping time period A: the number of orthogonal radio resources
f: hopping pattern calculation function FIGS. 20A and 20B illustrate forms in which the radio resource index (R) of each location grid changes over time when M=2 and A=4 are set. FIG. 20A illustrates the radio resource index at t=0. FIG. 20B illustrates the radio resource index at t=T.

In FIG. 20A, the user apparatus UE present in the location grid of which the radio resource index is "2" transmits the D2D signal using the same radio resource. That is, when there are the plurality of user apparatuses UE in the location grid, the D2D signals may interfere with each other.

On the other hand, in FIG. 20B in which T time elapses, the radio resource indexes of the location grids change to different values. That is, when time elapses, the radio resources available to transmit the D2D signal in the location grids change. Thus, even when the radio resources are duplicated between the nearby location grids and interference occurs, the radio resources available for each time change. Therefore, it is possible to suppress an influence of the interference.

To realize the operation by the above-described equations, the base station eNB or the CN apparatus 10 may include information indicating the radio resources (the time resources and the frequency resources) for each radio resource index, a value of "T," and a value of "A" in the "D2D radio resource allocation information", and thus, the information, the value of "T," and the value of "A" are indicated to the user apparatus UE. The hopping pattern calculation function (f) may be retained in advance in the user apparatus UE.

(Method of Allocating Radio Recourses by Base Station or CN)

In the embodiment, when a request from the user apparatus UE is given, the base station eNB or the CN apparatus 10 may allocate the radio resources for the D2D signal and indicate to the user apparatus UE the radio resources. Further, by causing the user apparatus UE to indicate the position of the user apparatus UE, the base station eNB or the CN apparatus 10 may allocate the radio resources (or the D2D resource pool) in such a way the radio resources for the D2D signal are orthogonal between the nearby user apparatuses UE.

Figure 21:
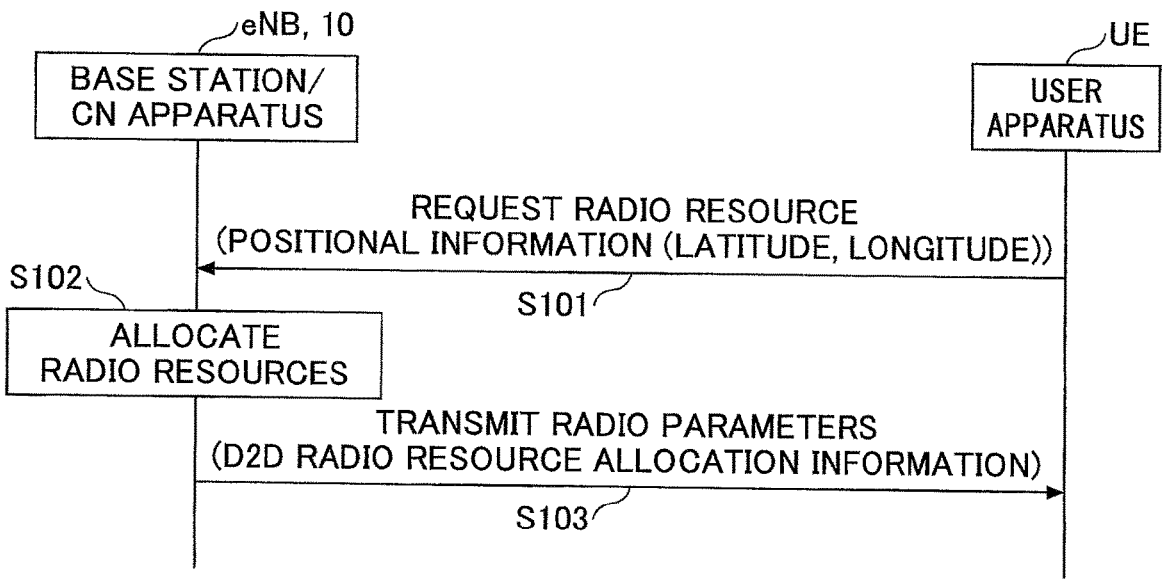
FIG. 21 is a sequence diagram for describing a process procedure when radio resources are allocated.

FIG. 21 is a sequence diagram for describing a process procedure when radio resources are allocated. Step S101 is equivalent to step S32 of FIG. 12 or steps S41 and S42 of FIG. 13. Step S102 is equivalent to step S33 of FIG. 12 or step S43 of FIG. 13. Step S103 is equivalent to step S34 of FIG. 12 or steps S44 and S45 of FIG. 13.

In step S101, the user apparatus UE transmits a signal for requesting allocation of the D2D radio resources to the base station eNB or the CN apparatus 10. This signal includes a current position of the user apparatus UE. The current position of the user apparatus UE may be expressed with latitude and longitude.

In step S102, the base station eNB or the CN apparatus 10 allocates the radio resources in such a way that the radio resources for the D2D signal are orthogonal between the nearby user apparatuses UE based on positional information indicated by the user apparatus UE. The base station eNB or the CN apparatus 10 stores the UE IDs of the user apparatuses UE and the allocated radio resources in association therewith to manage the radio resources allocated to the user apparatuses UE.

In step S103, the base station eNB or the CN apparatus 10 transmits the D2D radio parameter information including the "D2D radio resource allocation information" to the user apparatus UE.

When the CN apparatus 10 allocates the radio resources in the foregoing process procedure, it is possible to realize the allocation of the orthogonal radio resources to the plurality of user apparatuses UE present across different cells, different carriers, different RATs, and different PLMN.

On the other hand, when the base station eNB allocates the radio resources, the base station eNB may register the UE ID of the user apparatus UE, the position of the user apparatus UE, and the radio resource allocated to the user apparatus UE in the CN apparatus 10 in association therewith. Further, when the base station eNB allocates the radio resources to the user apparatuses UE, the base station eNB may inquire about the radio resources allocated in the vicinity of the position of the user apparatus UE by indicating to the CN apparatus 10 the position of the user apparatus UE to which the radio resources are scheduled to be allocated and select the unallocated radio resources in the vicinity of the position based on an inquiry result. Thus, even when the base station eNB allocates the radio resources, it is possible to realize the allocation of the orthogonal radio resources to the plurality of user apparatuses UE present across different cells, different carriers, different RATs, and different PLMN.

Alternatively, when the base station eNB allocates the radio resources by exchanging the allocated radio resources and the allocated radio resources and information regarding the UE IDs and the positions of the user apparatuses UE to which the radio resources are allocated using the backhaul signaling between the base stations eNB, the base station eNB may allocate the orthogonal radio resources to the plurality of user apparatuses UE present across different cells.

In the foregoing process procedure, the user apparatus UE may include a traveling state (movement state) such as a movement speed and a movement direction in addition to the current position of the user apparatus UE in the radio resource request transmitted in step S101. Thus, when the base station eNB or the CN apparatus 10 allocates the radio resources, it is possible to perform an optimization process of managing a valid period of the allocated radio resources. The signal for requesting the allocation of the D2D radio resources in step S101 may be a D2D (PC5) buffer status report (BSR).

Here, assume a case in which the user apparatus UE moves and thus the allocated radio resources collide (are duplicated) between the nearby user apparatuses UE. Accordingly, in the embodiment, the collision of the radio resources may be configured to be avoided in the process procedure to be described below.

Figure 22:
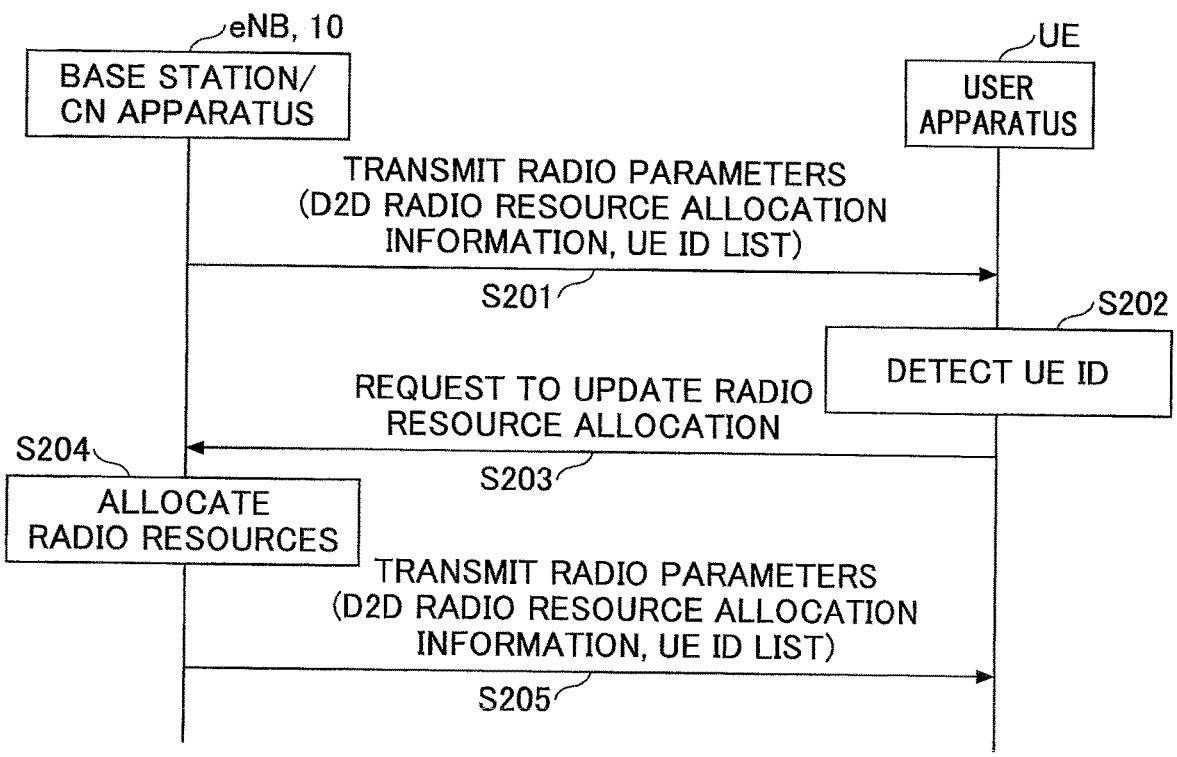
FIG. 22 is a sequence diagram for describing a process procedure (part 1) when collision of the allocated radio resources is avoided.

FIG. 22 is a sequence diagram for describing a process procedure (part 1) when collision of the allocated radio resources is avoided.

In step S201, the base station eNB or the CN apparatus 10 includes a UE ID list in the D2D radio parameter information including the "D2D radio resource allocation information" to transmit the UE ID list to the user apparatus UE. The UE ID list is a list indicating the UE IDs of the user apparatuses UE to which the same radio resources are allocated. The process procedure of step S201 is equivalent to the process procedure of step S103 of FIG. 21.

In step S202, the user apparatus UE detects that the user apparatus UE with the UE ID included in the UE ID list transmits the D2D signal. For example, the user apparatus UE may monitor the allocated radio resource (subframe) and confirm that the UE ID in the UE ID list is stored in the transmission source information (SRC) included in the UE ID list in the MAC header. When the user apparatus UE detects that the user apparatus UE with the UE ID included in the UE ID list transmits the D2D signal, the process procedure proceeds to the process procedure of step S203.

In step S203, the user apparatus UE requests the base station eNB or the CN apparatus 10 to update the D2D radio resource allocated to the user apparatus UE.

In step S204, the base station eNB or the CN apparatus 10 allocates a different radio resource from the radio resource indicated in the process procedure of step S201.

In step S205, the base station eNB or the CN apparatus 10 includes the UE ID list in the D2D radio parameter information including the "D2D radio resource allocation information" to transmit the UE ID list to the user apparatus UE.

Figure 23:
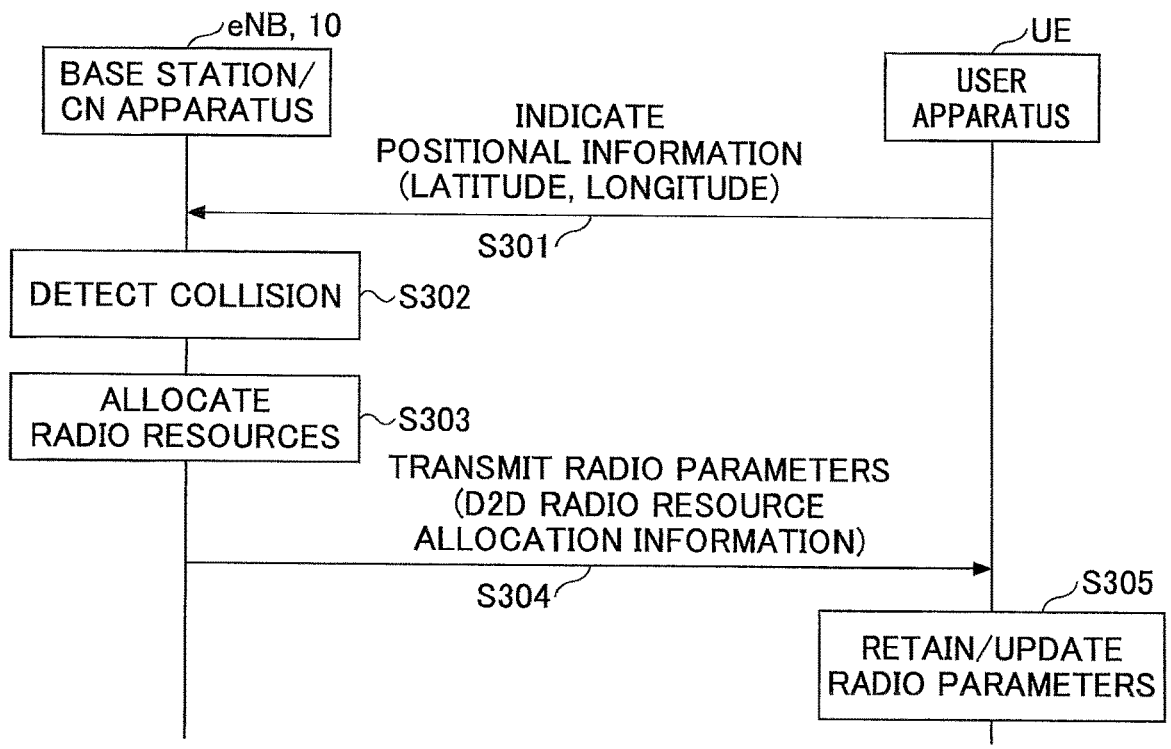
FIG. 23 is a sequence diagram for describing a process procedure (part 2) when collision of the allocated radio resources is avoided.

FIG. 23 is a sequence diagram for describing a process procedure (part 2) when collision of the allocated radio resources is avoided.

In step S301, the user apparatus UE transmits positional information indicating a current position of the user apparatus UE to the base station eNB or the CN apparatus 10. The current position of the user apparatus UE may be expressed with latitude and longitude. The user apparatus UE may transmit the positional information indicating the current position of the user apparatus UE at a predetermined period to the base station eNB or the CN apparatus 10. When the user apparatus UE moves by a predetermined distance, the user apparatus UE may transmit the positional information indicating the current position of the user apparatus UE to the base station eNB or the CN apparatus 10.

In step S302, the base station eNB or the CN apparatus 10 detects that the radio resource allocated to the user apparatus UE, from which the positional information indication signal is received, collides with (is the same as) the radio resource allocated to another user apparatus UE located in the vicinity of the current position of the user apparatus UE.

In step S303, the base station eNB or the CN apparatus 10 allocates another radio resource which does not collide with the radio resource allocated to the user apparatus UE located in the vicinity of the current position of the user apparatus UE.

In step S303, the base station eNB or the CN apparatus 10 transmits the D2D radio parameter information including the "D2D radio resource allocation information" to the user apparatus UE. When the RRC state of the user apparatus UE is idle, the base station eNB or the CN apparatus 10 may indicate to the user apparatus UE the D2D radio parameter information including the "D2D radio resource allocation information" in accordance with the method described in "<Method of Indication to User Equipment in RRC IDLE>."

<Radio Resource Request Method Performed by User Equipment in RRC IDLE>

As described above, when the user apparatus UE requests the D2D radio parameter information, the user apparatus UE transmits the radio parameter request signal to the base station eNB. Here, when the user apparatus UE is in the RRC idle state, it is necessary for the user apparatus UE to perform a random access procedure once to establish RRC connection and NAS bearer with the base station eNB and then transmit a radio parameter request signal.

Accordingly, in the embodiment, when the user apparatus UE requests the D2D radio parameter information from the base station eNB, the user apparatus UE may request the D2D radio parameter information without establishing the RRC connection and the NAS bearer or by omitting some of the processes of establishing the RRC connection and the NAS bearer in accordance with a process procedure to be described below.

(Process Procedure in which RA Procedure is Used)

Figure 24:
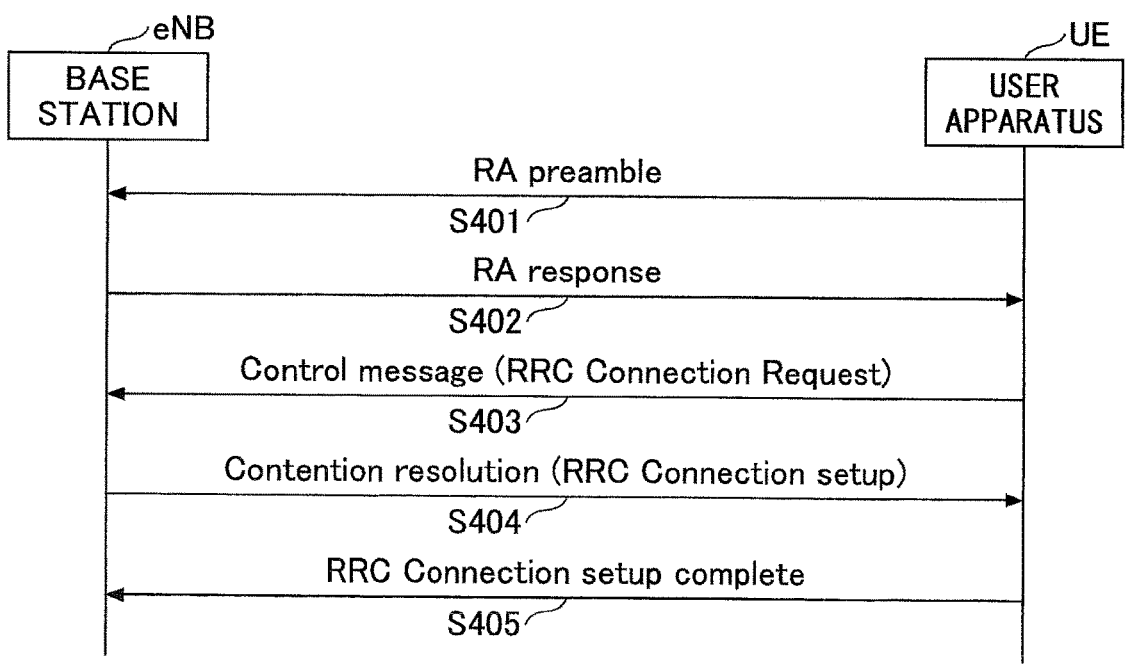
FIG. 24 is a diagram illustrating an RA procedure of the related art.

FIG. 24 is a diagram illustrating an RA procedure of the related art. For example, in the process procedure of step S401, the user apparatus UE may transmit a special RA preamble to the base station eNB. When the base station eNB receives the special RA preamble, the user apparatus UE determines that the user apparatus UE requests the D2D radio parameter information.

The special RA preamble may be an RA preamble transmitted with a pre-decided carrier frequency, may be an RA preamble transmitted via a designated radio resource from the base station eNB to the user apparatus UE in advance, or may be a specific preamble sequence (group). Alternatively, the special RA preamble may be an RA preamble calculated by substituting the UE identifier (1MSI or the like) to a predetermined calculation equation. Alternatively, the special RA preamble may be an RA preamble transmitted with a specific preamble sequence in a specific D2D resource pool.

As another example, a control message transmitted in the process procedure of step S403 may include information indicating that the D2D radio parameter information is requested. When the control message includes the information, the base station eNB determines that the user apparatus UE requests the D2D radio parameter information. The user apparatus UE may include information (latitude, longitude, and the like) indicating a current position of the user apparatus UE in the control message in addition the information indicating that the D2D radio parameter information is requested.

When the base station eNB determines that the user apparatus UE requests the D2D radio parameter information, the base station eNB may include the D2D radio parameter information in an RRC connection setup signal transmitted in the process procedure of step S404 to transmit the D2D radio parameter information to the user apparatus UE or may receive an RRC connection setup complete signal and then transmit a message including the D2D radio parameter information to the user apparatus UE.

When the user apparatus UE request the D2D radio parameter information from the base station eNB using the above-described process procedure, the user apparatus UE does not transmit an NAS message (for example, an attach request) in the RA procedure. The user apparatus UE may explicitly indicate to the base station eNB that establishment of a radio bearer for transmitting and receiving an NAS message is not requested or may implicitly indicate to the base station eNB using a special signaling message. Even when the NAS message is transmitted, a data amount of a signaling message may be suppressed by including only a capability related to V2X in UE capability information among UE capabilities.

The base station eNB may simplify a radio resource configuration (Radio Resource Config Common or Radio Resource Config Dedicated) dedicated for a macro cell included in an RRC connection setup signal in the process procedure of step S404. In the embodiment, an information element (IE) for the simplified radio resource configuration may be newly defined. Thus, it is possible to suppress a data amount of the signaling message and suppress payment of an individual radio resource (an SRS transmission resource or the like) of the user apparatus UE.

The user apparatus UE may not include dedicated Info NAS in the RRC connection setup complete signal transmitted in the process procedure of step S405 or may include information indicating that there is no NAS bearer. By explicitly indicating to the base station eNB that NAS connection is not made from the user apparatus UE, it is possible to suppress unnecessary communication for the NAS connection between the base station eNB and the CN apparatus 10.

(Process Procedure in which D2D Signal is Used)

Figure 25:
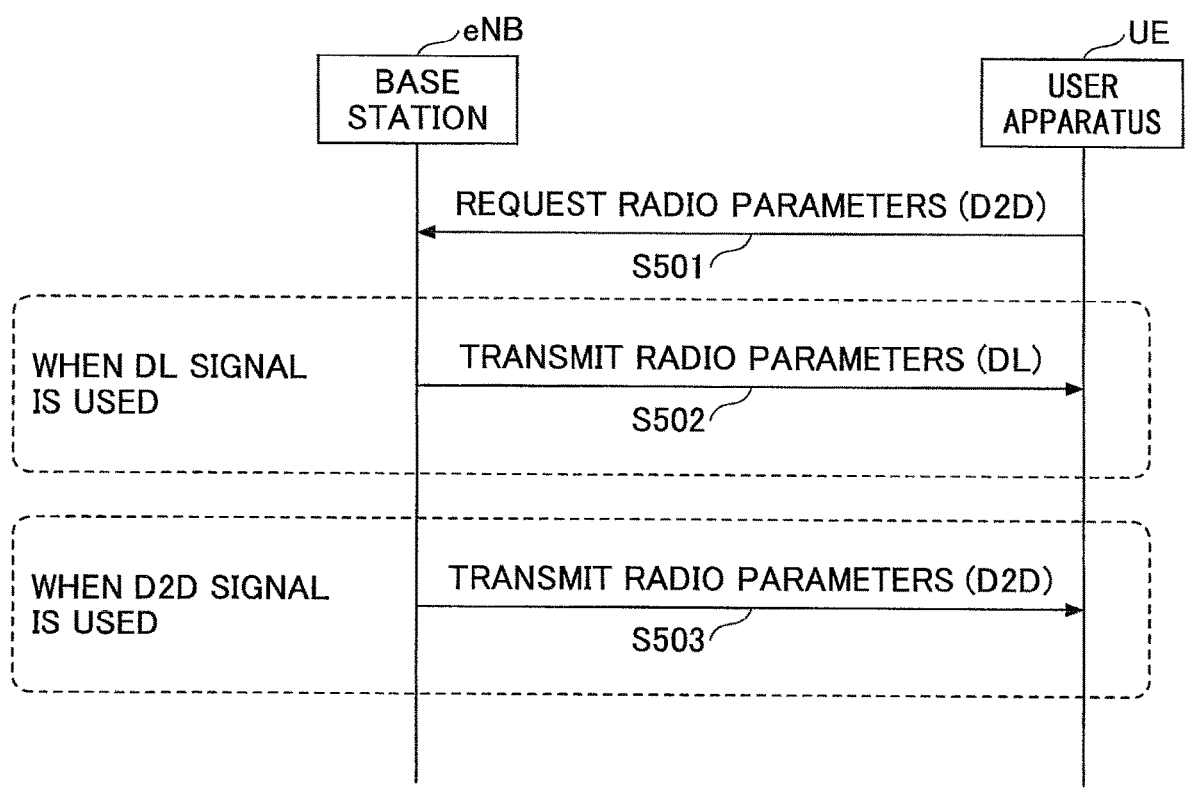
FIG. 25 is a sequence diagram illustrating a process procedure when a radio parameter request is performed using a D2D signal.

FIG. 25 is a sequence diagram illustrating a process procedure when a radio parameter request is performed using a D2D signal.

In step S501, the user apparatus UE transmits a radio parameter request signal to the base station eNB using a d2D signal (side link). The radio parameter request signal may be permitted to be transmitted in only a special D2D resource pool designated in advance. The special D2D resource pool may be indicated to the user apparatus UE using report information or the special D2D resource pool may be set in advance via USIM or the like.

The user apparatus UE may include an ID (a physical cell ID, a D2D ID, or the like) of the base station eNB from which the user apparatus UE desires to receive a response in the radio parameter request signal. The base station eNB transmits the D2D radio parameter information to the user apparatus UE only when the radio parameter request signal includes the ID of the base station eNB. Thus, it is possible to prevent the base stations eNB receiving the D2D signals from transmitting the D2D radio parameter information together.

The user apparatus UE may realize orthogonalization and interference randomization of an RS sequence by mapping the IDs or some of the IDs of the base stations eNB for which the response is desired to the DM-RS sequence of the D2D signals including the radio parameter request signals.

In step S502, the base station eNB transmits the D2D radio parameter information with a downlink (DL). The transmission with the DL means transmission of the D2D radio parameter information using the PDSCH.

The user apparatus UE may include candidates for the DL radio resource or the carriers (or a list of the carriers) receivable by the user apparatus UE in the radio parameter request signal to indicate to the base station eNB the candidates for the DL radio resource or the carriers in the process procedure of step S501. The base station eNB can transmit the D2D radio parameter information using the indicated DL radio resource or carriers and can also transmit the D2D radio parameter information using carriers corresponding to the capability of the user apparatus UE (UE capability) or contract information.

The base station eNB may perform CRC masking of the DCI of the subframe including the D2D radio parameter information using the special RNTI in the process procedure of step S502. Thus, the user apparatus UE can perform CRC checking using the special RNTI when the subframe including the D2D radio parameter information is monitored, and thus it is possible to reduce battery consumption and prevent unrelated data from being erroneously received.

The base station eNB may restrict the radio resources at the time of transmitting the D2D radio parameter information in step S502 using the index indicating the radio resource in which the radio parameter request in step S501 is detected and/or the UE identifier of the user apparatus UE transmitting the radio parameter request. The base station eNB may include the index indicating the radio resources and/or the UE identifier or the like of the user apparatus UE in the D2D radio parameter information in step S502. Thus, the user apparatus UE can reduce battery consumption by restricting the radio resources to be monitored. By including the index indicating the radio resources and/or the UE identifier or the like of the user apparatus UE in the D2D radio parameter information, it is possible to prevent the user apparatus UE from erroneously receiving unrelated data.

In step S503, the base station eNB transmits the D2D signal (side link) including the D2D radio parameter information. The base station eNB may perform CRC masking on the control information (SCI) related to the D2D signal including the D2D radio parameter information using a special bit string, may include the D2D radio parameter information in the control information (SCI) to transmit the D2D radio parameter information, or may transmit the D2D signal including the D2D radio parameter information in a special D2D resource pool. Thus, the user apparatus UE can recognize that the D2D signal is transmitted from the base station eNB, and thus can perform an operation of performing, for example, a reception process preferentially.

The base station eNB may restrict the radio resources at the time of transmitting the D2D signal including the D2D radio parameter information in the process procedure of step S503 using the index indicating the radio resource in which the radio parameter request in the process procedure of step S501 is detected and/or the UE identifier of the user apparatus UE transmitting the radio parameter request. The base station eNB may include the index indicating the radio resources and/or the UE identifier or the like of the user apparatus UE in the D2D radio parameter information in the process procedure of step S503. Thus, the user apparatus UE can reduce battery consumption by restricting the radio resources to be monitored. By including the index indicating the radio resources and/or the UE identifier or the like of the user apparatus UE in the D2D radio parameter information, it is possible to prevent the user apparatus UE from erroneously receiving unrelated data.

<Hardware Configuration>

(User Equipment)

Figure 26:
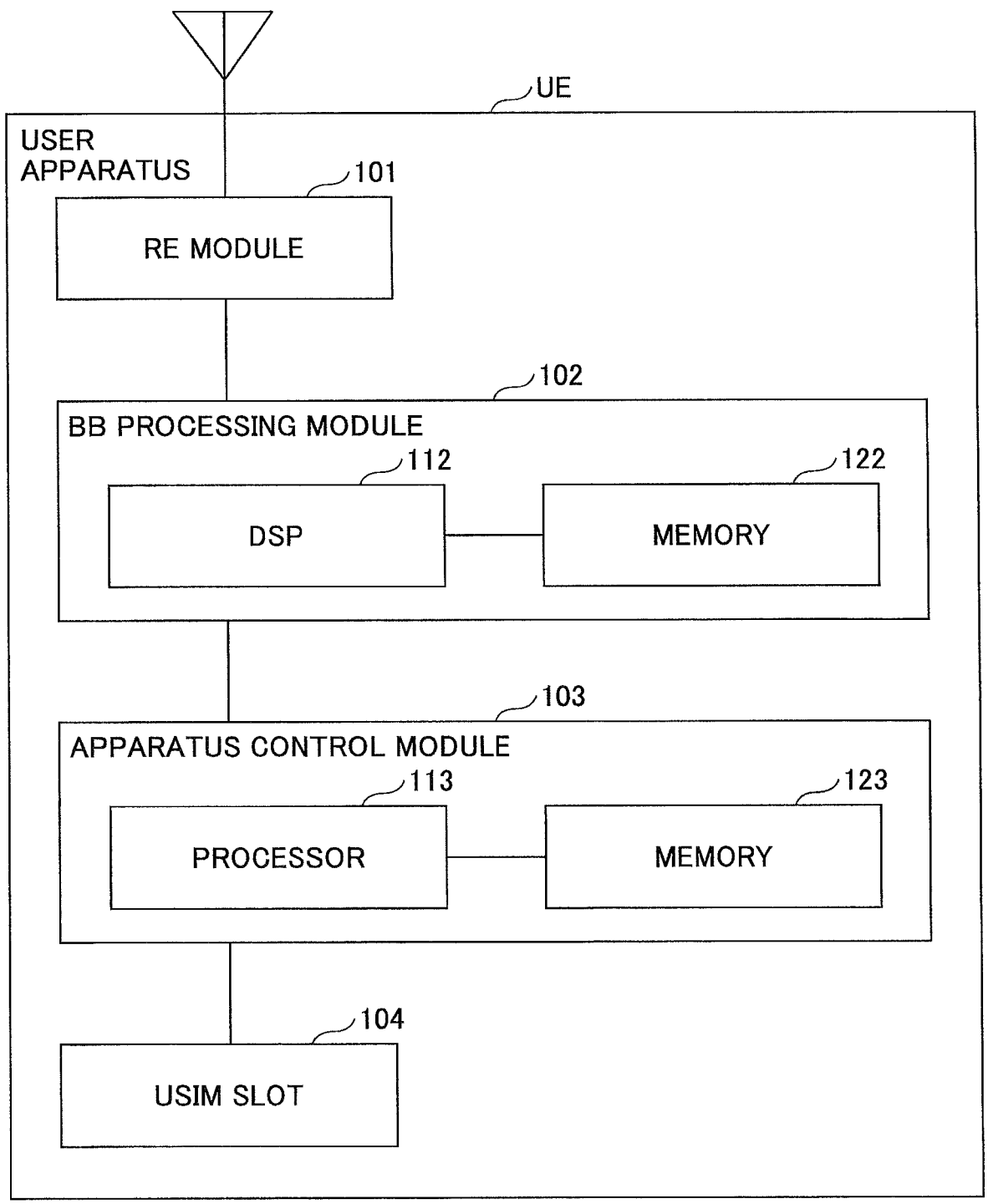
FIG. 26 is a diagram illustrating a hardware configuration example of the user apparatus according to an embodiment.

FIG. 26 is a diagram illustrating a hardware configuration example of the user apparatus according to an embodiment. As illustrated in FIG. 26, the user apparatus UE includes a radio equipment (RE) module 101 that performs a process related to a radio signal, a baseband (BB) processing module 102 that performs baseband signal processing, an apparatus control module 103 that performs a process of a higher layer, and a USIM slot 104 which is an interface accessed by a USIM card.

The RE module 101 generates a radio signal to be transmitted from an antenna by performing digital-to-analog (D/A) conversion, modulation, frequency conversion, power amplification, and the like on the digital baseband signal received from the BB processing module 102. Then, the RE module 101 generates a digital baseband signal by performing frequency conversion, analog-to-digital (A/D) conversion, demodulation, and the like on the received radio signal and transfers the digital baseband signal to the BB processing module 102.

The BB processing module 102 performs a process of mutually converting an IP packet and a digital baseband signal. A digital signal processor (DSP) 112 is a processor that performs signal processing in the BB processing module 102. A memory 122 is used as a work area of the DSP 112.

The apparatus control module 103 performs an IP layer protocol process and a process of various applications. A processor 113 is a processor that performs a process performed by the apparatus control module 103. A memory 123 is used as a work area of the processor 113. The processor 113 reads and record data from and on a USIM via the USIM slot 104.

(Base Station)

Figure 27:
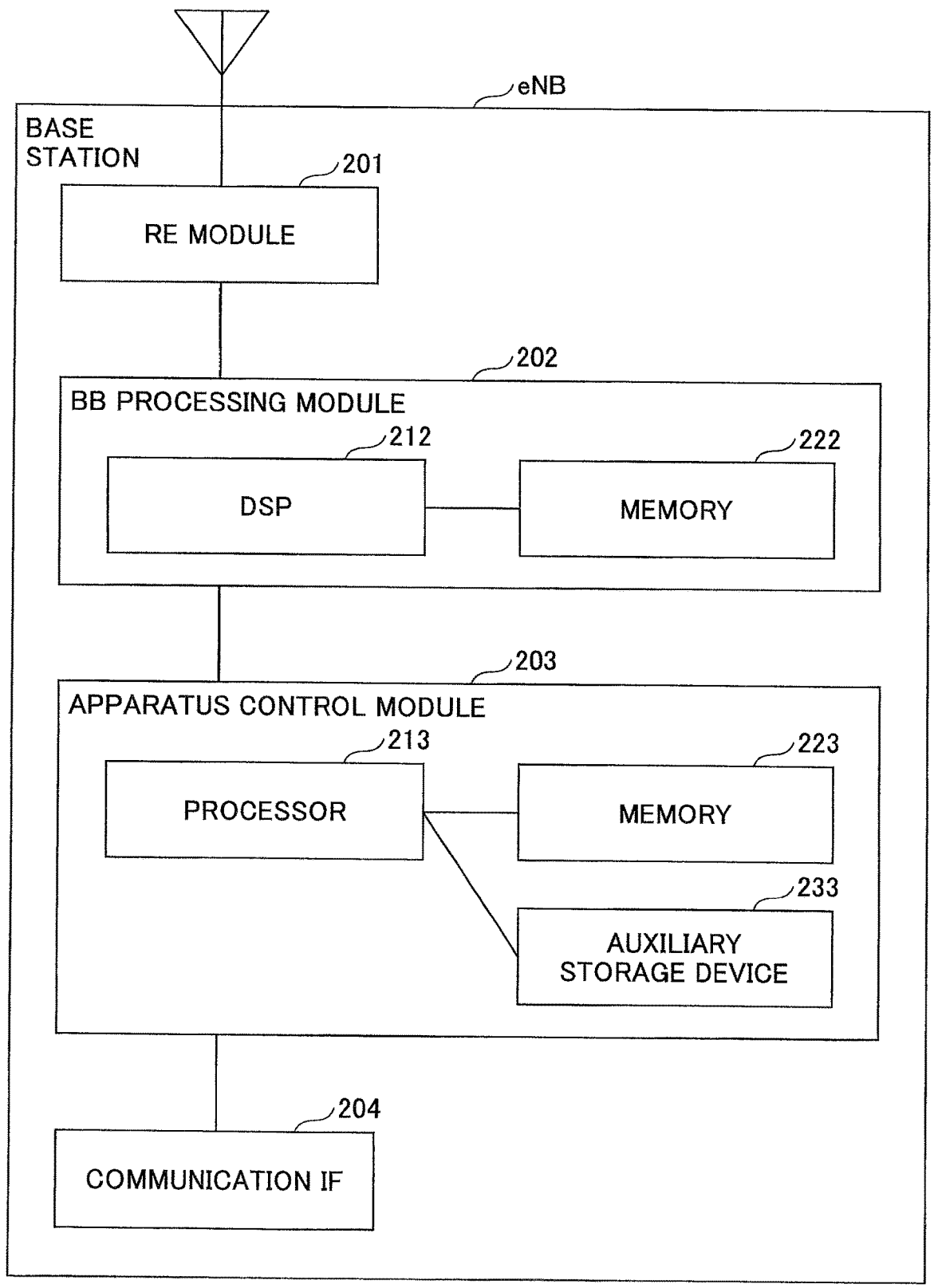
FIG. 27 is a diagram illustrating a hardware configuration example of a base station according to an embodiment.

FIG. 27 is a diagram illustrating a hardware configuration example of a base station according to an embodiment. As illustrated in FIG. 27, the base station includes an RE module 201 that performs a process on a radio signal, a BB processing module 202 that performs baseband signal processing, an apparatus control module 203 that performs a process of a higher layer or the like, and a communication IF 204 which is an interface connected to a network.

The RE module 201 generates a radio signal to be transmitted from an antenna by performing D/A conversion, modulation, frequency conversion, and power amplification, and the like on the digital baseband signal received from the BB processing module 202. Then, the RE module 201 generates a digital baseband signal by performing frequency conversion, A/D conversion, demodulation, and the like on the received radio signal and transfers the digital baseband signal to the BB processing module 202.

The BB processing module 202 performs a process of mutually converting an IP packet and the digital baseband signal. A DSP 212 is a processor that performs signal processing n the BB processing module 202. A memory 222 is used as a work area of the DSP 212.

The apparatus control module 203 performs an IP layer protocol process and an OAM process. A processor 213 is a processor that performs a process performed by the apparatus control module 203. A memory 223 is used as a work area of the processor 213. An auxiliary storage device 233 is, for example, an HDD and stores various kind of setting information or the like used for the base station eNB to operate.

Figure 28:
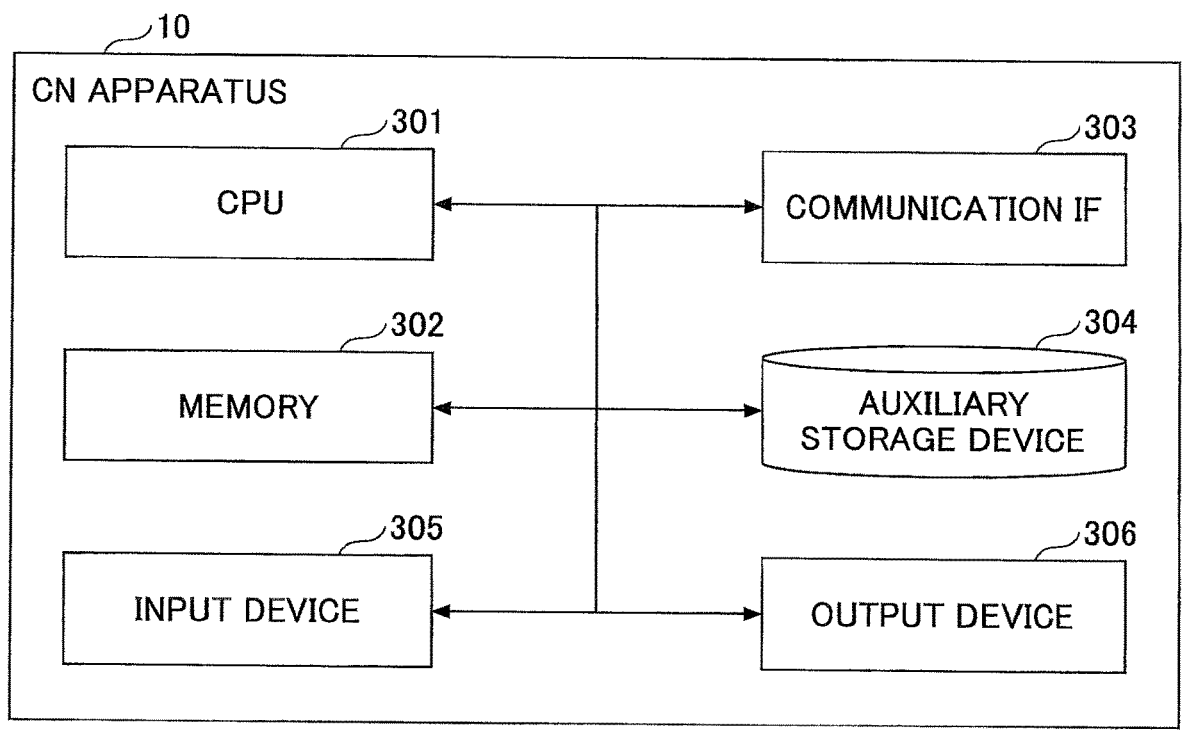
FIG. 28 is a diagram illustrating a hardware configuration example of a core network apparatus according to an embodiment.

FIG. 28 is a diagram illustrating a hardware configuration example of the CN apparatus according to an embodiment. As illustrated in FIG. 28, the CN apparatus 10 includes a central processing unit (CPU) 301 that controls an operation of the entire CN apparatus 10, a memory 302 that is used as a work area of the CPU 301, a communication IF 303 that communicates with the base station eNB and another switcher, an auxiliary storage device 304 that stores various kinds of data used in the CN apparatus 10 and a program causing the CN apparatus 10 to operate, an input device 305 such as a keyboard, and an output device 306 that displays various kinds of information.

<Functional Configuration>

Functional configuration examples of the user apparatus UE, the base station eNB, and the CN apparatus 10 performing the operations according to the above-described embodiments will be described.

(User Equipment)

Figure 29:
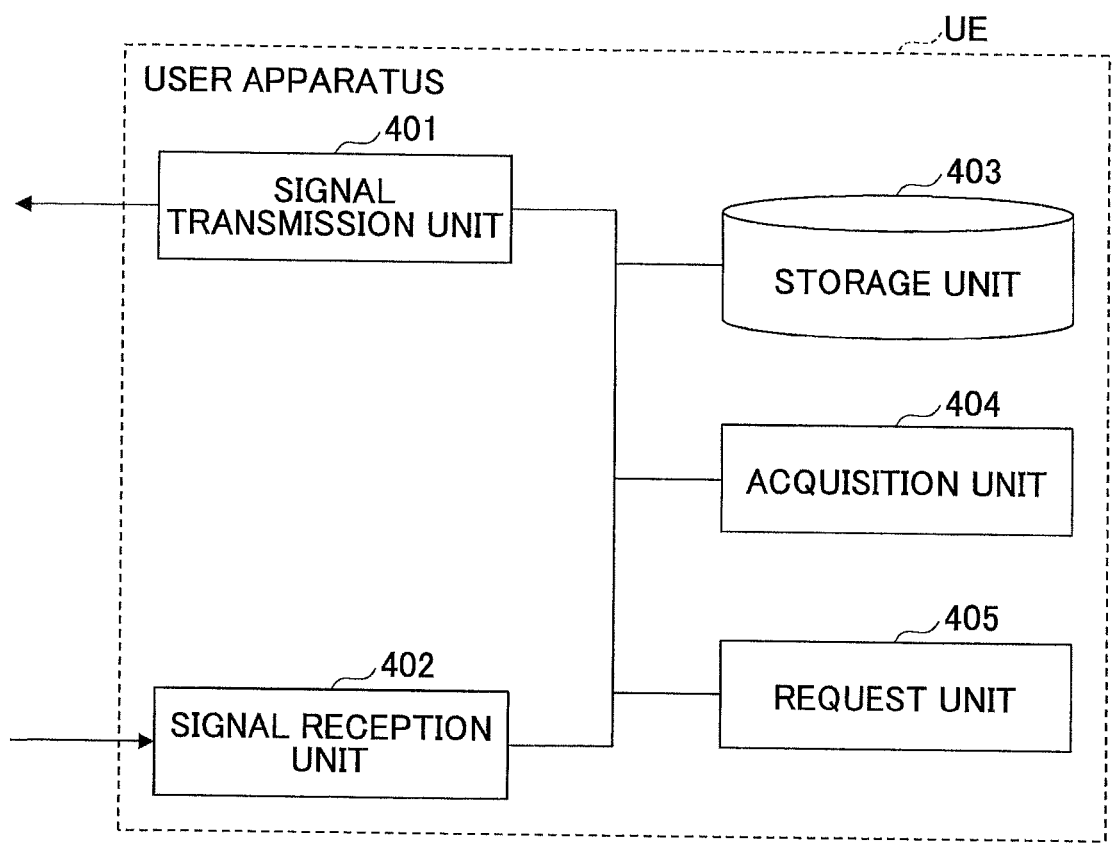
FIG. 29 is a diagram illustrating a functional configuration example of the user apparatus according to an embodiment.

FIG. 29 is a diagram illustrating a functional configuration example of the user apparatus according to an embodiment. As illustrated in FIG. 29, the user apparatus UE includes a signal transmission unit 401, a signal reception unit 402, a storage unit 403, an acquisition unit 404, and a request unit 405. FIG. 29 illustrates only functional units of the user apparatus UE particularly related to an embodiment of the invention and the user apparatus UE also has functions (not illustrated) of performing operations in conformity to at least LTE. The functional configuration illustrated in FIG. 29 is merely an example. Any functional division and names of the functional units may be used as long as the operations according to the embodiment can be performed.

The signal transmission unit 401 has a function of generating various signals of the physical layer from signals of higher layers to be transmitted from the user apparatus UE and wirelessly transmitting the signals. The signal transmission unit 401 has a D2D signal transmission function and a cellular communication transmission function. The signal transmission unit 401 transmits a D2D signal using a radio resource used to transmit the D2D signal allocated to the user apparatus UE.

The signal reception unit 402 has a function of wireless receiving various signals from another user apparatus UE or the base station eNB and acquiring signals of higher layers from the received signals of the physical layer. The signal reception unit 402 has a D2D signal reception function and a cellular communication reception function.

The signal transmission unit 401 and the signal reception unit 402 transmit and receive the D2D signals using the radio parameters included in the D2D wireless parameter information corresponding to the region in which the user apparatus UE is located.

The signal transmission unit 401 and the signal reception unit 402 may specify the radio resources based on information included in the D2D radio parameter and used for specifying the radio resources used to transmit the D2D signals and transmit the D2D signals using the specified radio resources.

The storage unit 403 stores the D2D radio parameter information.

The acquisition unit 404 acquires the D2D radio parameter information from the base station eNB or the CN apparatus 10 and stores the D2D radio parameter information in the storage unit 403. The acquisition unit 404 may monitor a specific subframe used to indicate/transmit the D2D radio parameter information regardless of whether the RRC is idle and may acquire the D2D radio parameter information included in the specific subframe when it is detected that the identifier allocated to the user apparatus UE is included in the specific subframe.

The request unit 405 requests the base station eNB or the CN apparatus 10 to transmit the D2D radio parameter information by transmitting a radio parameter request signal to the base station eNB or the CN apparatus 10 via the signal transmission unit 401. The request unit 405 may include information indicating the position of the user apparatus UE in the request signal for requesting allocation of the radio resources used to transmit the D2D signals to transmit the information to the base station eNB or the CN apparatus 10.

When the D2D radio resource allocation information include the IDs indicating other user apparatus UE and the D2D signal received by the signal reception unit 402 includes the IDs indicating other user apparatuses, the request unit 405 may transmit a request signal for requesting a change in the radio resources used to transmit the D2D signal allocated to the user apparatus UE to the base station eNB or the CN apparatus 10.

(Base Station)

Figure 30:
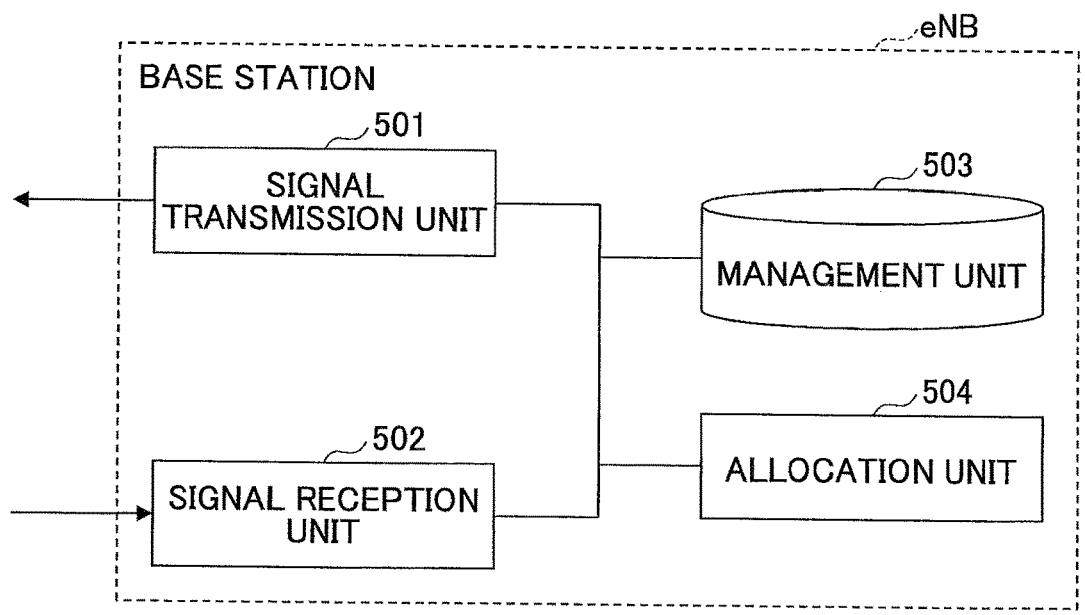
FIG. 30 is a diagram illustrating a functional configuration example of a base station according to an embodiment.

FIG. 30 is a diagram illustrating a functional configuration example of the base station according to an embodiment. As illustrated in FIG. 30, the base station eNB includes a signal transmission unit 501, a signal reception unit 502, a management unit 503, and an allocation unit 504. FIG. 30 illustrates only functional units of the base station eNB particularly related to an embodiment of the invention and the base station eNB also has functions (not illustrated) of performing operations in conformity to at least LTE. The functional configuration illustrated in FIG. 30 is merely an example. Any functional division and names of the functional units may be used as long as the operations according to the embodiment can be performed.

The signal transmission unit 501 has a function of generating various signals of the physical layer from signals of higher layers to be transmitted from the base station eNB and wirelessly transmitting the signals. The signal transmission unit 501 transmits the D2D radio parameter information managed by the management unit 503 to the user apparatus UE. The signal transmission unit 501 has a D2D signal transmission function. The signal transmission unit 501 may transmit the D2D radio parameter information to the user apparatus when the signal reception unit 502 receives the D2D signal indicating that the D2D radio parameter is requested.

The signal reception unit 502 has a function of wireless receiving various signals from the user apparatus UE and acquiring signals of higher layers from the received signals of the physical layer. The signal reception unit 502 has a D2D signal reception function.

The management unit 503 manages the D2D radio parameter corresponding to the region belonging to the base station eNB. The management unit 503 may manage the D2D radio parameters corresponding to all the regions.

The management unit 503 may manage the radio parameters (the D2D radio resources or the like) allocated to the user apparatus UE by the allocation unit 504 in association with the identifier of the user apparatus UE. When the allocation of the D2D radio parameters (the D2D radio resources or the like) is requested from the user apparatus UE, the management unit 503 may instruct the allocation unit 504 to allocate the D2D parameters or may request the CN apparatus 10 to allocate the D2D parameters (the D2D radio resources or the like).

The allocation unit 504 allocates the D2D radio parameters (the D2D radio resources or the like) in response to the instruction from the management unit 503 to the user apparatuses UE. The allocation unit 504 may indicate to the management unit 503 the radio parameter allocated to the user apparatus UE in association with the identifier of the user apparatus UE. The allocation unit 504 may allocate the radio parameter for each user apparatus UE by selecting the radio parameter from the radio parameter pool managed by the management unit 503.

(CN Apparatus)

Figure 31:
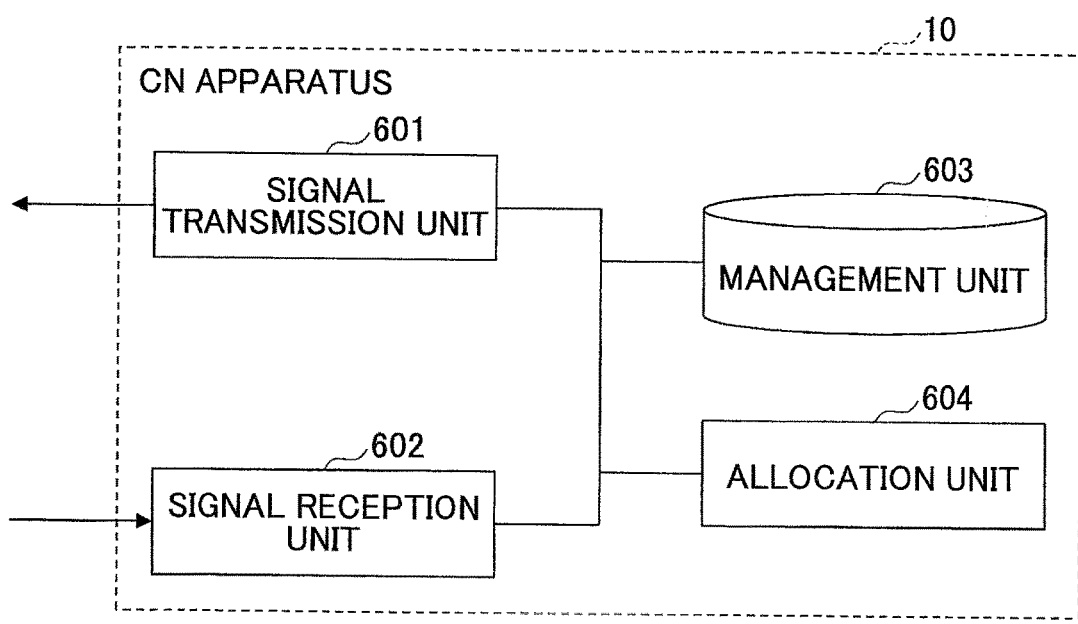
FIG. 31 is a diagram illustrating a functional configuration example of a core network apparatus according to an embodiment.

FIG. 31 is a diagram illustrating a functional configuration example of the CN apparatus according to an embodiment. As illustrated in FIG. 31, the CN apparatus 10 includes a signal transmission unit 601, a signal reception unit 602, a management unit 603, and an allocation unit 604. FIG. 31 illustrates only functional units of the CN apparatus 10 particularly related to an embodiment of the invention and the CN apparatus 10 also has functions (not illustrated) of performing operations in conformity to at least LTE. The functional configuration illustrated in FIG. 31 is merely an example. Any functional division and names of the functional units may be used as long as the operations according to the embodiment can be performed.

The signal transmission unit 601 has a function of generating a signal to be transmitted from the CN apparatus 10 and transmitting the signal. The signal reception unit 602 has a function of a receiving various signals from the base station eNB.

The management unit 603 manages the D2D radio parameters corresponding to all the regions. The management unit 603 may manage the radio parameters (the D2D radio resources or the like) allocated to the user apparatus UE by the allocation unit 604 in association with the identifier of the user apparatus UE. When the allocation of the D2D radio resources (the D2D radio resources or the like) is requested from the user apparatus UE, the management unit 603 may instruct the allocation unit 604 to allocate the D2D radio resources.

The allocation unit 604 allocates the D2D radio parameters (the D2D radio resources or the like) in response to the instruction from the management unit 603 to the user apparatuses UE. The allocation unit 604 may indicate to the management unit 603 the radio parameter allocated to the user apparatus UE in association with the identifier of the user apparatus UE. The allocation unit 604 may allocate the radio parameter for each user apparatus UE by selecting the radio parameter from the radio parameter pool managed by the management unit 603.

CONCLUSION

As described above, according to an embodiment, there is provided a user apparatus in a radio communication system that supports D2D. The user apparatus includes: an acquisition unit configured to acquire radio parameter information including a D2D radio parameter managed in a unit of a predetermined region including a plurality of cells from a base station; and a communication unit configured to transmit and receive a D2D signal using the D2D radio parameter in the predetermined region. In the user apparatus UE, it is possible to provide a technology for enabling the D2D radio parameter to be efficiently indicated to the user apparatus UE.

The communication unit may specify a radio resource based on information included the D2D radio parameter and used for specifying the radio resource used to transmit a D2D signal and transmit the D2D signal using the specified radio resource. Thus, it is possible to specify the radio resources which can be used to transmit the D2D signal by the user apparatus UE.

The user apparatus may further include a request unit configured to transmit a request signal which is used for requesting allocation of the radio resource used to transmit the D2D signal and which includes information indicating a position of the user apparatus to the base station. The acquisition unit may acquire radio resource allocation information indicating the radio resource used to transmit the D2D signal allocated to the user apparatus from the base station. The communication unit may transmit the D2D signal using the radio resource used to transmit the D2D signal allocated to the user apparatus. Thus, the base station eNB can allocate the radio resources based on the position of the user apparatus UE. For example, it is possible to control the allocation of the orthogonal radio resources between the nearby user apparatuses UE.

The acquisition unit may acquire an ID indicating another user apparatus different from the user apparatus along with the radio resource allocation information. When the D2D signal received by the communication unit includes the ID indicating the other user apparatus, the request unit may transmit a request signal for requesting a change of the radio resource used to transmit the D2D signal allocated to the user apparatus to the base station. Thus, the user apparatus UE can detect collision of the allocated radio resources between the nearby user apparatuses UE and request the base station eNB to allocate other radio resources.

The acquisition unit may monitor a specific subframe used to indicate the radio parameter information regardless of whether an RRC is idle and acquire the radio parameter information included in the specific subframe when it is detected that an identifier allocated to the user apparatus is included in the specific subframe. Thus, the base station eNB can indicate the user apparatus UE the D2D radio parameter information regardless of the RRC state of the user apparatus UE.

The predetermined region may be a region indicated with latitude and longitude or a region indicated in a tracking area. Thus, the radio communication system according to the embodiment can define the regions in various units.

According to an embodiment, there is a base station in a radio communication system that supports D2D. The base station includes: a management unit configured to manage radio parameter information including a D2D radio parameter managed in a unit of a predetermined region including a plurality of cells; and a transmission unit configured to transmit the radio parameter information to a user apparatus. In the base station eNB, it is possible to provide a technology for enabling the D2D radio parameter to be efficiently indicated to the user apparatus.

The base station may further include a reception unit configured to receive a D2D signal. The transmission unit may transmit the radio parameter information to the user apparatus when the reception unit receives the D2D signal indicating a request for the D2D radio parameter. Thus, the user apparatus UE can request the base station eNB to transmit the D2D radio parameter information using the D2D signal even when the RRC state is idle.

According to an embodiment, there is provided a communication method performed by a user apparatus in a radio communication system that supports D2D. The method includes: acquiring radio parameter information including a D2D radio parameter managed in a unit of a predetermined region including a plurality of cells from a base station; and transmitting and receiving a D2D signal using the D2D radio parameter in the predetermined region. According to the communication method, it is possible to provide a technology for enabling the D2D radio parameter to be efficiently indicated to the user apparatus.

According to an embodiment, there is provided an indication method performed by a base station in a radio communication system that supports D2D. The method includes: managing radio parameter information including a D2D radio parameter managed in a unit of a predetermined region including a plurality of cells; and transmitting the radio parameter information to a user apparatus. According to the communication method, it is possible to provide a technology for enabling the D2D radio parameter to be efficiently indicated to the user apparatus.

Supplements of Embodiments

The method claims propose elements of various steps in a sampling procedure and the invention is not limited to the specific proposed procedures unless stated in the claims.

As described above, the configuration of each apparatus (the user apparatus UE/the base station eNB/the CN apparatus 10) described in the embodiment of the invention may be realized by causing a CPU (processor) to execute a program in the device including the CPU and a memory or may be realized by hardware such as a hardware circuit including a logic of the process described in the embodiment. Alternatively, the program and the hardware may be mixed.

The embodiments of the invention have been described above, but the disclosed invention is not limited to the embodiments. Those skilled in the art can understand various modifications, corrections, substitutions, replacements, and the like. To promote understanding of the invention, the description has been made using examples of specific numerical values. These numerical values are merely examples and any appropriate values may be used unless otherwise stated. The classification of the items in the foregoing description are not fundamental, but matters described in two or more items may be combined to be used as necessary or matters described in any item may be applied to matters described in other items (unless the matters are inconsistent). The boundaries of the functional units or the processing units in the functional block diagrams may not necessarily correspond to the boundaries of physical components. Operations of the plurality of functional units may be performed physically by one component or an operation of one functional unit may be performed physically by a plurality of components. The procedures of the sequences and the flowcharts described in the embodiments may be switched without being inconsistent. To facilitate the description of the processes, the user apparatus UE/the base station eNB/the CN apparatus 10 have been described with reference to the functional block diagrams, but the devices may be realized hardware, software, or a combination thereof. Software operated by the processor included in the base station 1 according to the embodiments of the invention, software operated by the processor included in the user apparatus UE according to the embodiments of the invention according to the embodiments of the invention, software operated by the processor included in the CN apparatus 10 according to the embodiment of the invention may each be stored in any other appropriate storage medium such as a random access memory (RAM), a flash memory, a read-only memory (ROM), an EPROM, an EEPROM, a register, a hard disk (HDD), a removable disk, a CD-ROM, a database, and a server.

In the embodiment, the signal transmission unit 401 and the signal reception unit 402 are examples of a communication unit. The D2D radio parameter information is an example of radio parameter information. The signal transmission unit 501 is an example of a transmission unit. The signal reception unit 502 is an example of a reception unit.

Priority is claimed on Japanese Patent Application No. 2015-187521, filed Sep. 24, 2015, the content of Japanese Patent Application No. 2015-187521 is incorporated herein by reference.

EXPLANATIONS OF LETTERS OR NUMERALS

UE user apparatus
eNB base station
10 CN apparatus
401 signal transmission unit
402 signal reception unit
403 storage unit
404 acquisition unit
405 request unit
501 signal transmission unit
502 signal reception unit
503 management unit
504 allocation unit
601 signal transmission unit
602 signal reception unit
603 management unit
604 allocation unit

The invention claimed is:

1. A user apparatus in a radio communication system that supports Device-to-Device (D2D), the user apparatus comprising:
 a processor coupled to a transceiver configured to, by using radio parameter information including a D2D radio parameter managed in a unit of a predetermined region, transmit and receive a D2D signal in the predetermined region, wherein the radio parameter information also includes a region identifier that identifies the predetermined region and a region range that indicates a range of the predetermined region.

2. The user apparatus according to claim 1, wherein the processor coupled to the transceiver is further configured to acquire the radio parameter information from a base station.

3. The user apparatus according to claim 2, wherein the processor coupled to the transceiver specifies a radio resource and transmits the D2D signal using the specified radio resource, wherein the D2D radio parameter includes information to specify the radio resource.

4. The user apparatus according to claim 2, wherein the processor coupled to the transceiver is further configured to transmit a request signal which is used for requesting allocation of a radio resource used to transmit the D2D signal and which includes information indicating a position of the user apparatus to the base station,
wherein the processor coupled to the transceiver acquires radio resource allocation information indicating the radio resource used to transmit the D2D signal allocated to the user apparatus from the base station, and
wherein the transceiver transmits the D2D signal using the radio resource used to transmit the D2D signal allocated to the user apparatus.

5. The user apparatus according to claim 4,
wherein the processor coupled to the transceiver acquires an identifier (ID) indicating another user apparatus different from the user apparatus along with the radio resource allocation information, and
wherein when the D2D signal received by the transceiver includes the ID indicating the other user apparatus, the processor coupled to the transceiver transmits a request signal for requesting a change of the radio resource used to transmit the D2D signal allocated to the user apparatus to the base station.

6. The user apparatus according to claim 2, wherein the processor coupled to the transceiver monitors a specific subframe used to indicate the radio parameter information regardless of whether a Radio Resource Control (RRC) is idle and acquires the radio parameter information included in the specific subframe when it is detected that an identifier allocated to the user apparatus is included in the specific subframe.

7. The user apparatus according to claim 1, wherein the predetermined region is a region indicated with latitude and longitude.

8. A base station in a radio communication system that supports Device-to-Device (D2D), the base station comprising:
a processor configured to manage radio parameter information including a D2D radio parameter managed in a unit of a predetermined region,
wherein the radio parameter information also includes a region identifier that identifies the predetermined region and a region range that indicates a range of the predetermined region; and
a transmitter configured to transmit the radio parameter information to a user apparatus.

9. The base station according to claim 8, further comprising:
a receiver configured to receive a D2D signal,
wherein the transmitter transmits the radio parameter information to the user apparatus when the receiver receives the D2D signal indicating a request for the D2D radio parameter.

10. A communication method performed by a user apparatus in a radio communication system that supports Device-to-Device (D2D), the method comprising:
transmitting and receiving, by using radio parameter information including a D2D radio parameter managed in a unit of a predetermined region, a D2D signal in the predetermined region,
wherein the radio parameter information also includes a region identifier that identifies the predetermined region and a region range that indicates a range of the predetermined region.

11. An indication method performed by a base station in a radio communication system that supports Device-to-Device (D2D), the method comprising:
managing radio parameter information including a D2D radio parameter managed in a unit of a predetermined region,
wherein, the radio parameter information also includes a region identifier that identifies the predetermined region and a region range that indicates a range of the predetermined region; and
transmitting the radio parameter information to a user apparatus.

12. The user apparatus according to claim 3, wherein the processer coupled to the transceiver monitors a specific subframe used to indicate the radio parameter information regardless of whether a Radio Resource Control (RRC) is idle and acquires the radio parameter information included in the specific subframe when it is detected that an identifier allocated to the user apparatus is included in the specific subframe.

13. The user apparatus according to claim 4, wherein the processer coupled to the transceiver monitors a specific subframe used to indicate the radio parameter information regardless of whether a Radio Resource Control (RRC) is idle and acquires the radio parameter information included in the specific subframe when it is detected that an identifier allocated to the user apparatus is included in the specific subframe.

14. The user apparatus according to claim 5, wherein the processer coupled to the transceiver monitors a specific subframe used to indicate the radio parameter information regardless of whether a Radio Resource Control (RRC) is idle and acquires the radio parameter information included in the specific subframe when it is detected that an identifier allocated to the user apparatus is included in the specific subframe.

15. The user apparatus according to claim 2, wherein the predetermined region is a region indicated with latitude and longitude.

16. The user apparatus according to claim 3, wherein the predetermined region is a region indicated with latitude and longitude.

17. The user apparatus according to claim 4, wherein the predetermined region is a region indicated with latitude and longitude.

18. The user apparatus according to claim 5, wherein the predetermined region is a region indicated with latitude and longitude.

19. The user apparatus according to claim 6, wherein the predetermined region is a region indicated with latitude and longitude.

* * * * *